(12) United States Patent
Imamura et al.

(10) Patent No.: US 7,223,815 B2
(45) Date of Patent: May 29, 2007

(54) POLYLACTIC ACID COMPOSITION CONTAINING MODIFIER

(75) Inventors: Shouji Imamura, Sakura (JP); Toshiro Ariga, Abiko (JP); Hideyuki Furuta, Chiba (JP); Takashi Mihara, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 233 days.

(21) Appl. No.: 10/507,685

(22) PCT Filed: Mar. 26, 2002

(86) PCT No.: PCT/JP02/02915

§ 371 (c)(1),
(2), (4) Date: Sep. 22, 2004

(87) PCT Pub. No.: WO03/080699

PCT Pub. Date: Oct. 2, 2003

(65) Prior Publication Data

US 2005/0159583 A1 Jul. 21, 2005

(51) Int. Cl.
*C08L 67/00* (2006.01)
*C08L 67/02* (2006.01)
*C08L 67/04* (2006.01)

(52) U.S. Cl. .................. 525/88; 525/92 A; 525/92 B; 525/92 F

(58) Field of Classification Search .............. 525/88, 525/92 A, 92 B, 92 F
See application file for complete search history.

(56) References Cited

U.S. PATENT DOCUMENTS

| | | | |
|---|---|---|---|
| 5,202,413 A | 4/1993 | Spinu ..................... | 528/354 |
| 5,286,501 A * | 2/1994 | Song et al. ............... | 426/3 |
| 5,502,158 A | 3/1996 | Sinclair et al. | |
| 5,824,751 A | 10/1998 | Hori et al. | |
| 6,211,249 B1 | 4/2001 | Cohn et al. ............. | 514/772.1 |
| 6,303,677 B1 | 10/2001 | Warzelhan et al. ....... | 524/291 |
| 6,579,952 B1 * | 6/2003 | Niki et al. ............... | 525/440 |
| 2002/0198332 A1 * | 12/2002 | Kasemura et al. ........ | 525/450 |

FOREIGN PATENT DOCUMENTS

| | | |
|---|---|---|
| EP | 0 723 983 A2 | 7/1996 |
| JP | 8-501584 | 2/1996 |
| JP | 8-198957 | 8/1996 |
| JP | 8-199052 | 8/1996 |
| JP | 08-231838 | 9/1996 |
| JP | 08-253665 | 10/1996 |
| JP | 8-283557 | 10/1996 |
| JP | 9-137047 | 5/1997 |
| JP | 10-36651 | 2/1998 |
| JP | 10-316846 | 12/1998 |

OTHER PUBLICATIONS

Lefevre et al; "Synthesis and thermal characterization of crystallizable poly(caprolactone)/poly(hexamethylene terephthalate) block copolymer;" Polymer 42 (2001) 8769-8777.

Lefebvre et al "Bis(4-monosubstituted-5(4H)oxazolinones) as coupling agents for block copolymer synthesis: reaction with hydroxy-terminated oligomers;" Macromol. Chem. Phys. 199, 2747-2753 (1998).

Tian et al; "Macromolecular Engineering of Polylactones and Polylactides, 23. Synthesis and Characterization of Biodegradable and Biocompatible Homopolymers and Block Copolymers Based on 1,4,8-Trioxal[4,6]spiro-9-undecanone;" Macromolecules 30, (1997); 1947-1954.

Ferruti et al; "Synthesis and properties of novel block copolymers containing poly(lactic-glycolic acid) and poly(ethyleneglycol) segments;" Biomaterials, vol. 16, No. 18 (1995) 1423-1428.

Tsai et al; "Block copolyetheresters, etc."; Polymer Bulletin 35, No. 6 (Dec. 1995); 743-749.

Lofgren et al; "Synthesis and Characterization of Biodegradable Homopolymers and Block Copolymers Based on 1,5-Dioxepan-2-one;" Macromolecules, vol. 27 No. 20 (1994) 5556-5562.

Grijma et al; "Rubber Toughening of Poly(Lactide) by Blending and Block Copolymerization;" Polymer Eng. And Science; vol. 34, No. 22 (Nov. 1994) 1674-1684.

Sangen et al; "A New Synthetic Pathway of Segmented Tri-Block Copolyether;" J. Polymer Science; Part A: Polymer Chemistry Edition; 30, No. 6 (May 1992); 1171-1175.

European Search Report dated Jun. 16, 2005.

Van Krevelen; "Properties of polymer," D19 Elsevier (1990), Amsterdam; pp. 214.

European Office Action dated Apr. 20, 2006.

Van Krevelen, D. W., "Properties of Polymer", 3rd edition, 1990, Elsevier:Amsterdam, pp. 200-221.

Krause, S., "Polymer-Polymer Compatibility", in "Polymer Blends", vol. 1, Paul, D.R. and Newman, S., editors, Academic Press; New York, 1978, pp. 45-47.

* cited by examiner

*Primary Examiner*—Jeffrey Mullis
(74) *Attorney, Agent, or Firm*—Armstrong Kratz Quintos Hanson & Brooks, LLP

(57) ABSTRACT

A modifier for a polylactic acid comprising a block polymer (C) having a polymer block (A) satisfying relationship (1):

$$7.80 \leq \sigma/\rho < 8.54$$

wherein σ represents a solubility parameter value of a polymer block; and ρ represents a density value of a polymer block, and a polymer block (B) satisfying relationship (2):

$$8.54 \leq \sigma/\rho < 9.20$$

wherein σ and ρ have the same meanings as described above, wherein each of the aforementioned polymer block (A) and the aforementioned polymer block (B) is independently a polymer block selected from the group consisting of a polyester block, a polyether block, and a polyhydroxycarboxylic acid block, and said block polymer (C) has a glass transition temperature of 0° C. or lower, can enhance impact resistance, flexibility, and tensile strain, while biodegradability of the polylactic acids and thermal resistance are maintained, and in addition, is free from bleed-out from the moldings formed from a polylactic acid composition.

4 Claims, 1 Drawing Sheet

POLYLACTIC ACID COMPOSITION CONTAINING MODIFIER

TECHNICAL FIELD

The present invention relates to a modifier for a polylactic acid which imparts superior impact resistance to a polylactic acid and exhibits little bleed-out. In addition, the present invention relates to a polylactic acid composition useful as materials for various moldings, and in particular, as packaging materials.

BACKGROUND ART

A polylactic acid is known as a polymer which is transparent and has biodegradability and practical moldability. However, it has hard and brittle characteristics, and for this reason, industrial use thereof is limited. In order to ameliorate hard and brittle characteristics of polylactic acids, for example, Japanese Unexamined Patent Application, First Publication No. H08-199052 and Japanese Unexamined Patent Application, First Publication No. H08-283557 disclose a method in which a polyether or an aliphatic polyester formed from an aliphatic dicarboxylic acid and an aliphatic diol is added as a plasticizer.

However, even in each of the methods described above, with a common addition amount, impact strength of polylactic acids can be slightly improved. In order to provide sufficient flexibility, it is necessary to add a larger amount of a plasticizer. If such a larger amount of the plasticizer is added, there are problems in that thermal resistance may be degraded or bleed-out may occur.

In addition, Japanese Unexamined Patent Application, First Publication No. H09-137047 discloses a composition in which a plasticizer comprising a polyester-based block copolymer formed from a polymer with a high melting point composed of a polylactic acid and a polymer with a low melting point is added to a polylactic acid. However, the composition described above is also insufficient in view of impact resistance.

On the other hand, Japanese Translation of PCT International Application No. H08-501584 (U.S. Pat. No. 5,502,158) discloses that a plasticizer such as a polyester having a solubility parameter ranging from 7.5 to 16.5 (cal/cm$^3$), and in particular, ranging from 9.0 to 11.0 (cal/cm$^3$), exhibits good compatibility with respect to a polylactic acid, and has superior transparency. However, many plasticizers disclosed in the aforementioned publication are low molecular compounds. Therefore, there are problems in that during a step of adding a plasticizer to a polylactic acid or during molding with the obtained composition, the plasticizer may volatilize or the plasticizer may bleed out from the moldings.

Japanese Unexamined Patent Application, First Publication No. H10-316846 discloses that a plasticizer comprising an ester compound of a polylactic acid having a solubility parameter ranging from 10.6 to 11.6 exhibits good compatibility with respect to a polylactic acid, and has great plasticizing (softening) effects. However, in accordance with the aforementioned publication, many plasticizers supplied for research are compounds with a low molecular weight, and therefore, there are problems in volatilization of the plasticizer and in bleed-out from the moldings, as described above.

DISCLOSURE OF THE INVENTION

A first object of the present invention is to provide a modifier for a polylactic acid in which biodegradability of the polylactic acids and thermal resistance are maintained, at the same time, impact resistance, flexibility, and tensile strain are enhanced, and bleed-out from the moldings formed from a polylactic acid composition does not occur.

A second object of the present invention is to provide a polylactic acid composition having biodegradability of a polylactic acid and thermal resistance, and exhibiting superior impact resistance, flexibility, and tensile strain.

As a result of diligent research for compatibility of many polyesters and polylactic acids, the present inventors discovered that there is no basic relationship between a solubility parameter and compatibility; a σ/ρ value (wherein a σ represents a solubility parameter value of a polymer; and ρ represents a density value of a polymer) is important in the relationship between compatibility of a polyester and a polylactic acid and impact resistance or flexibility; and by employing a block polymer having two kinds of a polymer block (A) and a polymer block (B), each having a specified σ/ρ value, the objects described above can be achieved, thus completing the present invention.

That is, the present invention provides, in order to achieve the objects described above, a modifier for a polylactic acid, characterized by comprising a block polymer (C) having a polymer block (A) satisfying relationship (1):

$$7.80 \leq \sigma/\rho < 8.54$$

wherein σ represents a solubility parameter value of a polymer block; and ρ represents a density value of a polymer block, and a polymer block (B) satisfying relationship (2):

$$8.54 \leq \sigma/\rho < 9.20$$

wherein σ and ρ have the same meanings as described above, wherein each of said polymer block (A) and said polymer block (B) is independently a polymer block selected from the group consisting of a polyester block, a polyether block, and a polyhydroxycarboxylic acid block, and said block polymer (C) has a glass transition temperature of 0° C. or lower.

In addition, the present invention provides, in order to achieve the object described above, a polylactic acid composition comprising a polylactic acid and the modifier for a polylactic acid described above.

In addition, the present invention provides a method for modifying a polylactic acid comprising the step of adding the modifier for a polylactic acid described above to a polylactic acid.

BEST MODE FOR CARRYING OUT THE INVENTION

Figure 1:
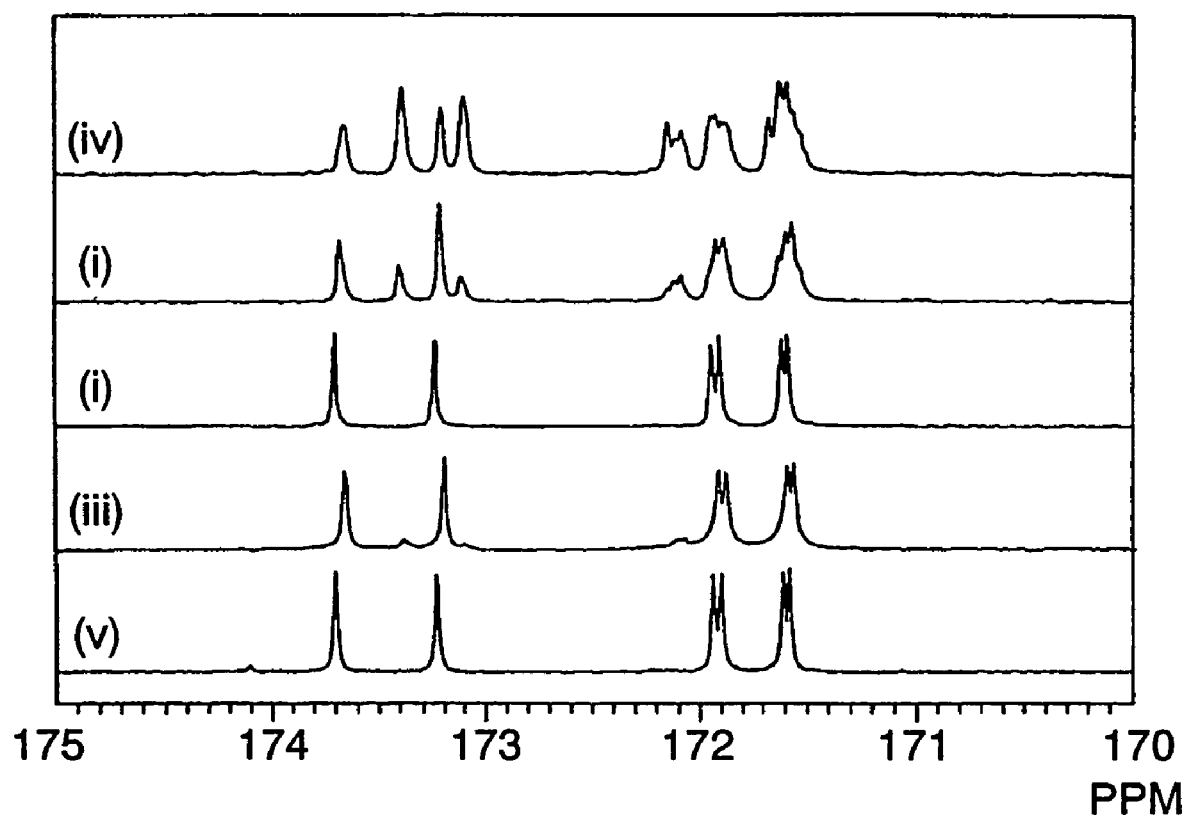
FIG. 1 shows $^{13}$C NMR spectra of polyesters produced in Preparation Example 1, Preparation Example 6, Preparation Example 10, and Comparative Preparation Example 10, respectively, and a polyester composition produced in Comparative Preparation Example 11.

The block polymer (C) employed in the modifier for a polylactic acid of the present invention can be produced, for example, in accordance with the preparation methods (1) and (2) described below.

Preparation method (1): A method in which a polymer (A) having a hydroxyl group or a carboxyl group at the terminal, selected from the group consisting of a polyester, a polyether, and a polyhydroxycarboxylic acid, and satisfying relationship (1):

$$7.80 \leq \sigma/\rho < 8.54$$

wherein $\sigma$ represents a solubility parameter value of a polymer; and $\rho$ represents a density value of a polymer, and a polymer (B) having a hydroxyl group or a carboxyl group at the terminal, selected from the group consisting of a polyester, a polyether, and a polyhydroxycarboxylic acid, and satisfying relationship (2):

$$8.54 \leq \sigma/\rho < 9.20$$

wherein $\sigma$ and $\rho$ have the same meanings as described above, are polycondensed.

Preparation method (2): A method in which a polymer (A) having a hydroxyl group or a carboxyl group at the terminal, selected from the group consisting of a polyester, a polyether, and a polyhydroxycarboxylic acid, and satisfying relationship (1):

$$7.80 \leq \sigma/\rho < 8.54$$

wherein $\sigma$ represents a solubility parameter value of a polymer; and $\rho$ represents a density value of a polymer, a polymer (B) having a hydroxyl group or a carboxyl group at the terminal, selected from the group consisting of a polyester, a polyether, and a polyhydroxycarboxylic acid, and satisfying relationship (2):

$$8.54 \leq \sigma/\rho < 9.20$$

wherein $\sigma$ and $\rho$ have the same meanings as described above, and a chain-lengthening agent are reacted.

The polymer (A) employed in the present invention is a polymer having a hydroxyl group or a carboxyl group at the terminal, selected from the group consisting of a polyester (hereinafter referred to as "polyester (A1)"), a polyether (hereinafter referred to as "polyether (A2)"), and a polyhydroxycarboxylic acid (hereinafter referred to as "polyhydroxycarboxylic acid (A3)"), and having a $\sigma/\rho$ value in the range of $7.80 \leq \sigma/\rho < 8.54$, preferably in the range of $7.8 \leq \sigma/\rho < 8.40$, and more preferably in the range of $7.80 \leq \sigma/\rho < 8.30$. The polymer (A) employed in the present invention has a $\sigma/\rho$ value which is close to 7.70, that is a $\sigma/\rho$ value of a polylactic acid. For this reason, the polymer (A) exhibits high compatibility with a polylactic acid and has compatibility with respect to a polylactic acid. The block polymer (C) produced from the polymer (A) described above can impart high tensile strain to the obtained polylactic acid composition. In addition, a glass transition temperature of the polymer (A) employed in the present invention is not particularly limited so long as impact resistance can be provided to the polylactic acid composition obtained by adding the block polymer (C) produced from the aforementioned polymer (A) to a polylactic acid. In order to provide superior impact resistance by the aforementioned polylactic acid composition, the glass transition temperature is preferably 0° C. or lower, and is more preferably −20° C. or lower.

Here, the $\sigma/\rho$ value is described. As the $\sigma/\rho$ value employed in the present invention, the value is one in which a molar attraction constant of the chemical group obtained by Hoy (see D. R. PAUL and SEYMUR NEWMAN, POLYMER BLENDS, vol. 1, ACADEMIC PRESS, pp. 46–47, 1978) is calculated as a numerical value per repeating unit of a polymer, and this is divided by a molecular weight per repeating unit. That is, it is represented by $\sigma/\rho = \Sigma Fi/M$ wherein Fi is defined herein as a molar attraction constant of the chemical group according to Hoy above; and M represents a molar molecular weight per repeating unit. Examples of the chemical groups and molar attraction constants of the chemical groups are shown in Table 1.

The calculation method, for example, in the case of an aliphatic polyester obtained by polycondensing ethylene glycol and succinic acid is described in detail. The aliphatic polyester has a repeating unit represented by a formula: —($CH_2$—$CH_2$—OCO—$CH_2$—$CH_2$—COO)—. Therefore, it has four chemical groups —$CH_2$— and two chemical groups —COO—. These are applied on the equation described above, the sum of the molar attraction constants of the chemical groups, $\Sigma Fi$, is $(131.5 \times 4 + 326.58 \times 2) = 1179.16$. On the other hand, the molar molecular weight (M) per repeating unit is 144.13. Therefore, $\sigma/\rho = 1179.16/144.13 = 8.18$.

A value of a polyester obtained in the same manner as described above is shown in Table 1.

TABLE 1

| Chemical group | Fi (molar attraction constants of the chemical group) | Number of each of chemical groups in the repeating unit of the polyester | | |
|---|---|---|---|---|
| | | EG-SuA | EG-DA | PLA |
| $CH_3$— | 147.3 | | 2 | 1 |
| —($CH_2$)— | 131.5 | 4 | 26 | |
| >CH— | 85.99 | | 4 | 1 |
| —COO | 326.58 | 2 | 2 | 1 |
| —HC= | 121.53 | | 4 | |
| 6-membered ring | −23.44 | | 1 | |
| $\Sigma fi$ | | 1179.16 | 5173.4 | 559.87 |
| M (molar molecular weight) | | 144.13 | 586.94 | 72.67 |
| $\Sigma \sigma/\rho$ (=$\Sigma Fi/M$) | | 8.18 | 8.81 | 7.70 |

In Table 1, EG represents ethylene glycol, SuA represents succinic acid, DA represents dimer acid, and PLA represents polylactic acid.

The polymer having a $\sigma/\rho$ value which is close to the $\sigma/\rho$ value of a polylactic acid has high compatibility with the polylactic acid. On the other hand, the polymer with the value which is greatly different therefrom has reduced compatibility with a polylactic acid.

In the case of a polyester composed of a diol component having 4 or less carbon atoms and a dicarboxylic acid component having 6 or less carbon atoms, the $\sigma/\rho$ value thereof is close to 7.70 that is the $\sigma/\rho$ value of a polylactic acid. For this reason, the aforementioned polyester can be preferably employed as the polymer (A).

As examples of the polyester (A1), mention may be made of, for example, polyethylene succinate, polytrimethylene succinate, polybutylene succinate, polyhexamethylene succinate, polyethylene adipatate, polypropylene adipate, polytrimethylene adipate, polybutylene adipate, polyethylene cyclohexanate, polypropylene cyclohexanate, polyhexamethylene cyclohexanate, and the like.

The polyester (A1) can be produced in accordance with a conventional preparation method, using, as raw materials, a diol and a dicarboxylic acid corresponding to the raw materials of the polyester described above. In addition, the polyester (A1) may have a higher molecular weight using a chain-lengthening agent such as an acid anhydride or a compound having two or more isocyanate groups as described below.

The polyester (A1) has a weight molecular weight (hereinafter, referred to as "Mw") preferably ranging from 1,000 to 100,000, more preferably ranging from 3,000 to 100,000, and further preferably ranging from 10,000 to 50,000.

As an example of the polyether (A2), mention may be made of, for example, polypropylene. As the polyether (A2), a polyether diol having hydroxyl groups at the two terminals is preferable in view of polycondensation reaction with the polymer (B) described below and reactivity with a chain-lengthening agent. The polyether diols having Mw ranging from several hundreds to several ten thousands are commercially available. The polyether (A2) employed as the polymer (A) has Mw preferably ranging from 1,000 to 20,000, and in particular, preferably ranging from 3,000 to 20,000. As the polyether (A2), one satisfying at least the conditions of the relationship (1) described above may be selected among the commercially available polyethers, and may be employed. In addition, in the case of employing a polyether diol having hydroxyl groups at the two terminals as the polyether (A2), a polyether having a hydroxyl group at only one terminal can be employed together therewith.

As examples of the polyhydroxycarboxylic acid (A3) employed as the polymer (A), mention may be made of, for example, poly-β-hydroxybutyrate, poly-β-hydroxyvalerate, poly-γ-butyrolactone, poly-δ-valerolactone, polyglycoride, and the like. The polyhydroxycarboxylic acid (A3) has Mw preferably ranging from 1,000 to 400,000, more preferably ranging from 3,000 to 200,000, and further preferably ranging from 10,000 to 100,000. As the polyhydroxycarboxylic acid (A3), one satisfying at least the conditions of the relationship (1) described above may be selected among commercially available polyhydroxycarboxylic acids, and may be employed.

On the other hand, the polymer (B) employed in the present invention is a polymer having a hydroxyl group or a carboxyl group at the terminal, selected from the group consisting of a polyester (hereinafter referred to as "polyester (B1)"), a polyether (hereinafter referred to as "polyether (B2)"), and a polyhydroxycarboxylic acid (hereinafter referred to as "polyhydroxycarboxylic acid (B3)"), and having a σ/ρ value in the range of 8.54≦σ/ρ<9.20. The polymer (B) has low compatibility with a polylactic acid, but has effects of imparting superior impact resistance to a polylactic acid.

The Tg of the polymer (B) employed in the present invention is not particularly limited so long as impact resistance can be provided to the polylactic acid composition obtained by adding the block polymer (C) produced from the aforementioned polymer (B) to a polylactic acid. In order to exhibit superior impact resistance of the aforementioned polylactic acid composition even under the conditions of 0° C. or lower for a container of frozen food or the like, Tg is preferably −20° C. or lower, is more preferably −30° C. or lower, and is further preferably −40° C. or lower.

As the polyester (B1), a polyester having an alkylene diol with 6 or more carbon atoms as a diol component is preferable. The polyester as described above tends to have a σ/ρ value of more than 7.70 regardless of the number of carbon atoms of the dicarboxylic acid component for forming the polyester, and for this reason, this is preferable. Among the polyesters (B1) as described above, a polyester having a dimer diol as a diol component is particularly preferable. In addition, as the polyester (B1), a polyester having an aliphatic dicarboxylic acid having the alkylene moiety with 7 or more carbon atoms as the dicarboxylic acid component is preferable. The polyester as described above tends to have a σ/ρ value of more than 7.70 regardless of the number of carbon atoms of the diol component, and for this reason, this is preferable. Among the polyesters (B1) as described above, a polyester having a dimer acid as a dicarboxylic acid component is particularly preferable. That is, as the polyester (B1), a polyester employing at least one kind of a dimer acid having an alkylene moiety with 7 or more carbon atoms and at least one kind of a dimer diol having 6 or more carbon atoms is preferable.

As examples of the polyesters (B1), mention may be made of a polyester having an aliphatic diol having 20 to 45 carbon atoms as a diol component, a polyester having an aliphatic dicarboxylic acid having an alkylene moiety with 20 to 45 carbon atoms as a dicarboxylic acid component, and a polyester formed from an aliphatic diol having 20 to 45 carbon atoms and an aliphatic dicarboxylic acid having an alkylene moiety with 20 to 45 carbon atoms. The ratio of the aliphatic diol having 20 to 45 carbon atoms and the aliphatic dicarboxylic acid having an alkylene moiety with 20 to 45 carbon atoms for forming the polyester (B1) is preferably 10 or more parts calculated on the basis of mass with respect to 100 parts of the polymer (B1), and is, in particular, preferably 30 or more parts.

As examples of the polyester (B1), mention may be made of polyethylene sebacate, polypropylene sebacate, polytrimethylene sebacate, polybutylene sebacate, polyhexamethylene sebacate, polyethylene decanate, polypropylene decanate, polytrimethylene decanate, polybutylene decanate, polyhexamethylene decanate, a polyester formed from a diol and a dimer acid, a polyester formed from 1,3-butylene glycol and sebacic acid or decanoic acid, a polyester formed from a polypropylene glycol and a dimer acid, and the like.

The polyester (B1) can be produced in accordance with a conventional preparation method using the diol described above and the dicarboxylic acid described above as raw materials.

As an example of the polyether (B2), mention may be made of, for example, a polyether having 4 to 10 carbon atoms in a repeating unit such as polytetramethylene glycol. As the polyether (B2), one satisfying at least the conditions of the relationship (2) described above may be selected among commercially available polyethers, and may be employed.

As examples of the polyhydroxycarboxylic acid (B3), mention may be made of, for example, a polyhydroxycarboxylic acid having 6 to 12 carbon atoms in the repeating unit such as poly-ω-undecalactone, and poly-ω-dodecanolactone. As the polyhydroxycarboxylic acid (B3), one satisfying at least the conditions of the relationship (2) described above may be selected among commercially available polyhydroxycarboxylic acids, and may be employed.

The polymer (B) employed in the present invention has Mw preferably ranging from 1,000 to 200,000, more preferably ranging from 3,000 to 100,000, and in particular, preferably ranging from 10,000 to 50,000.

In the ratio of the polymer (A) and the polymer (B) employed in the aforementioned preparation method (1), as mass ratio, (A):(B) preferably ranges from 10:90 to 90:10, more preferably ranges from 30:70 to 70:30, and in particular, preferably ranges from 40:60 to 60:40.

In the preparation method described above, a polycondensation reaction between the terminal hydroxyl group and carboxyl group of the polymer (A) and the polymer (B), and a polycondensation reaction between the terminal glycols of the polymer (A) and the polymer (B) are included.

That is, (1) a polycondensation reaction between the polyester (A1) and the polyhydroxycarboxylic acid (B3), the polyhydroxycarboxylic acid (A3) and the polyester (B1), the polyether (A2) and the polyhydroxycarboxylic acid (B3), the polyhydroxycarboxylic acid (A3) and the polyether (B2), or the polyhydroxycarboxylic acid (A3) and the polyhydroxycarboxylic acid (B3) includes a dehydration reaction between the terminal hydroxyl group and carboxylic acid, and also includes an ester-exchange reaction between the polymer (A) and the polymer (B) which is a side reaction;

(2) a polycondensation reaction between the polyester (A1) and the polyester (B1), the polyester (A1) and the polyether (B2), or the polyether (A2) and the polyester (B1) is a deglycol reaction between the terminal glycols.

In the case of directly reacting the polymer (A) and the polymer (B) by melting and mixing these, it is preferable that the polymer (A) and the polymer (B) be sufficiently reacted, and the reaction be carried out under high vacuum in order to make the obtained block polymer (C) have higher molecular weight. In particular, the reaction is carried out preferably at 1 to 1500 Pa, more preferably at 1000 Pa or lower, and in particular, preferably at 500 Pa or lower. In addition, the reaction temperature is preferably in the range of from 80 to 230° C., and furthermore, in order to shorten the reaction period and control coloration of the block polymer (C), the temperature is more preferably in the range of from 100 to 220° C., and is particularly preferably in the range of from 150 to 210° C. When the polymer (A) and the polymer (B) are mixed, both polymers or one of these may be dissolved in a solvent, and may be subsequently reacted. In the case of carrying out the reaction under reduced pressure, melting-and-mixing is preferable since vigorous foaming occurs.

In addition, it is preferable that the reaction described above be carried out in the presence of an esterification catalyst. As examples of the esterification catalysts described above, mention may be made of, for example, metal catalysts such as titanium, tin, zinc, zirconium, or aluminum, and in particular, mention may be made of, for example, titanium tetrapropoxide, titanium tetra-n-butoxide, titanium bisacetylacetonate, dibutyl tin oxide, tin octanoate, tin acetate, zinc octanoate, zinc acetate, zirconium oxide, acetylacetone iron, acetylacetone copper, acetylacetone aluminum, and the like.

The ratio of the polymer (A) and the polymer (B) employed in the aforementioned preparation method (2), as mass ratio, (A):(B) preferably ranges from 10:90 to 90:10, more preferably ranges from 30:70 to 70:30, and in particular, preferably ranges from 40:60 to 60:40.

The chain-lengthening agent employed in the present invention means a substance which can chemically bind the molecules of chain polymer compounds to each other, and can make them have higher molecular weight in the form of a chain. As examples of the chain-lengthening agents employed in the present invention, mention may be made of an acid anhydride or a compound having two or more isocyanate groups per molecule.

In the case of employing an acid anhydride as the chain-lengthening agent, the polymer (A) and the polymer (B) may be subjected to a polycondensation reaction in a conventional method. The polycondensation reaction is preferably carried out by adding an esterification catalyst in order to shorten the reaction period. As the esterification catalysts, the same ones as employed in the first preparation method of the aforementioned block polymer (C) can be employed.

As examples of acid anhydrides, mention may be made of, for example, succinic anhydride, cyclohexanedicarboxylic anhydride, phthalic anhydride, maleic anhydride, trimellitic anhydride, pyromellitic dianhydride, or a mixture thereof.

The amount of the employed acid anhydride preferably ranges from 0.01 to 5% by mass, is more preferably not less than 0.05% by mass, and is further preferably not less than 0.1% by mass, with respect to the total amount of the polymer (A) and the polymer (B). In addition, when the molecular weight of the obtained block polymer (C) is increased, high viscosity is exhibited, and workability tends to be impaired. For this reason, the upper limit of the employed amount of the acid anhydride is preferably not more than 2% by mass, and is more preferably not more than 1% by mass.

In the case of reacting the polymer (A) and the polymer (B) with the acid anhydride, the reaction is preferably carried out under high vacuum in order to sufficiently react the polymer (A) and the polymer (B) and control the coloration of the obtained block polymer (C). The vacuum degree in the aforementioned reaction preferably ranges from 1 to 1500 Pa, is more preferably not more than 1000 Pa, and is further preferably not more than 500 Pa. In addition, the reaction temperature of the aforementioned reaction preferably ranges from 80 to 230° C. In order to further reduce the reaction period and control the coloration of the block polymer (C), the reaction temperature more preferably ranges from 100 to 220° C., and further preferably ranges from 150 to 210° C. In addition, the reaction period of the aforementioned reaction preferably ranges from 0.5 to 10 hours. When the polymer (A) and the polymer (B) are mixed, they may be dissolved in a solvent, and be reacted. In the case of reacting these under reduced pressure, vigorous foaming occurs. For this reason, use of solvents is avoided, and it is preferable that melt-mixing be carried out.

On the other hand, in the preparation method (2), in the case of employing a compound having two or more isocyante groups per molecule as a chain-strengthening agent, the hydroxyl groups at the terminals of the polymer (A) and the polymer (B) and the isocyanate groups of the compound having isocyanate groups may be subjected to a polyaddition reaction in accordance with conventional methods. In order to control gelation, and obtain a block polymer (C) which substantially has a linear structure, it is preferable that a compound having two isocyanate groups per molecule be employed.

As examples of compounds having two isocyanate groups per molecule, mention may be made of, for example, hexamethylene diisocyanate, 2,4-tolylene diisocyanate, 2,5-tolylene diisocyanate, toluene diisocyanate, xylylene diisocyanate, diphenylmethane diisocyanate, 1,5-naphthylene diisocyanate, isophorone diisocyanate, hydrogenated diphenylmethane diisocyanate, polyethers modified with diisocyanate, polyesters modified with diisocyanate, or mixtures thereof.

In addition, in the case of obtaining a block polymer (C) having increased thermal resistance, a compound having three or more isocyanate groups per molecule can be employed.

In the case of employing a compound having three or more isocyanate groups per molecule, it is preferable that a small amount thereof be employed together with a compound having two isocyanate groups per molecule to perform a reaction without gelation, thus producing a product having high molecular weight.

The employed amount of the compound having two or more isocyanate groups per molecule preferably ranges from 0.01 to 5% by mass, is more preferably not less than 0.05% by mass, and is further preferably not less than 0.1% by mass, with respect to the total amount of the polymer (A) and the polymer (B). In addition, even if the molecular weight of the block polymer (C) is greatly increased, high viscosity is exhibited, and workability is reduced. For this reason, the upper limit of the usage amount of the compound having two or more isocyanate groups per molecule is preferably not more than 2% by mass, and is more preferably not more than 1% by mass.

In the case of reacting the polymer (A) and the polymer (B) with the compound having two or more isocyanate groups per molecule, the reaction temperature of the aforementioned reaction preferably ranges from 40 to 180° C. In order to reduce the reaction period and control coloration of the block polymer (C), it preferably ranges from 60 to 150° C., and more preferably ranges from 80 to 130° C. In addition, the reaction period of the aforementioned reaction preferably ranges from 0.5 to 10 hours.

The reaction employing a compound having two or more isocyanate groups per molecule is carried out by melt-mixing the polymer (A), the polymer (B), and the compound having two or more isocyanate groups per molecule, or by dissolving the polymer (A), the polymer (B), and the compound having two or more isocyanate groups per molecule in a solvent. As examples of solvents employed in the latter case, mention may be made of, for example, xylene, toluene, tetrahydrofuran, methyl ethyl ketone, acetone, chloroform, methylene chloride, ethyl acetate, and the like. In the case of the reaction by dissolving the polymer (A) and the polymer (B) in a solvent, due to reduction in viscosity of the reaction solution, dispersion properties of the compound having two or more isocyanate groups per molecule are improved, and for this reason, the reaction rate is high. However, since a step of removing the solvent is required, the reaction without solvents is preferable from an industrial point of view.

In addition, in the case of reacting the polymer (A) and the polymer (B) with the compound having two or more isocyanate groups per molecule, in order to reduce the reaction period, an urethanation catalyst can be employed together. As examples of the urethanation catalysts employed for the purpose described above, mention may be made of, for example, N,N-dimethylaniline, titanium tetraisopropoxide, titanium tetra-n-butoxide, tin octanoate, dibutyl tin dilaurate, and the like.

In the preparation method of the block polymer (C), if oxygen contaminates the reaction system, coloration or degradation may be caused. For this reason, when reduced pressure is released during adding catalysts or the like, an inert gas such as nitrogen is preferably employed.

As the block polymer (C), those having Mw ranging from 5,000 to 20,000 are preferable, and those having Mw ranging from 20,000 to 100,000 are more preferable. By adding the block polymer (C) having Mw of 5,000 or more to a polylactic acid, superior impact resistance can be imparted to the obtained polylactic acid composition, and bleed-out from moldings formed from the aforementioned polylactic acid compositions can be controlled. In addition, the block polymer (C) having Mw of less than 200,000 is preferable since superior compatibility with the polylactic acid is exhibited.

In the block polymer (C) employed in the present invention, it is necessary to have Tg of 0° C. or lower. In order to obtain the block polymer (C) as described above, kinds of the polymer (A) and the polymer (B) may be selected, and the usage ratio thereof and reaction conditions may be adjusted.

As Tg of the block polymer (C), there may be two Tg values originating from the polymer (A) and the polymer (B) employed in preparation of the block polymer (C). It is necessary to have the two Tg values of 0° C. or lower, preferably ranging from −70 to 0° C., and more preferably ranging from −65 to −20° C.

In the block polymer (C) employed in the present invention, storage modulus (E') or (G') at measurement temperature of 20° C. and at measurement frequency of 6.28 radian/sec is not more than 2.0 GPa. In order to impart greater impact resistance to the polylactic acid composition obtained by adding the block polymer (C), the storage modulus (E') or (G') of the block polymer (C) preferably ranges from 100 Pa to 1.2 GPa, and more preferably ranges from 0.01 GPa to 1.0 GPa. The block polymer (C) having storage modulus (E') or (G') of not more than 2.0 GPa forms a sea-island structure in which the polylactic acid corresponds to a sea phase and the block polymer (C) corresponds to an island phase. The block polymer (C) as the island phase absorbs impact, and as a result, superior impact resistance can be exhibited.

In the following, a polylactic acid composition comprising a polylactic acid and the modifier for the polylactic acid of the present invention is described.

Mass average molecular weight of the polylactic acid employed in the polylactic acid composition of the present invention is not particularly limited. In order to have superior mechanical strength, it is not necessary to provide the upper limit thereof. It is preferably 20,000 or more, is more preferably 50,000 or more, and is further preferably 70,000 or more.

The modifier for a lactic acid of the present invention may be melt-kneaded with the lactic acid, as it is, or can be employed in the condition of a masterbatch in which the modifier in a high concentration is preliminarily blended in the aforementioned polylactic acid.

The mixing ratio of the modifier for a polylactic acid of the present invention and the polylactic acid is not particularly limited. It is preferable that modifier:(polylactic acid) in a mass ratio range from 1:99 to 50:50. The polylactic acid composition having the composition ratio can maintain thermal resistance, at the same time, can improve impact resistance, flexibility, and tensile strain, and can control bleed-out. In the case of emphasizing transparency of the obtained moldings, the mass ratio of the modifier and the polylactic acid (modifier:(polylactic acid)) preferably ranges from 3:97 to 15:85.

In order to obtain the polylactic acid composition formed from a polylactic acid and the modifier for the polylactic acid of the present invention, both of the components are preferably melt-kneaded, and the kneading temperature thereof is preferably not lower than the melting point of the polylactic acid, and preferably ranges from approximately 180 to 220° C.

As examples of kneading apparatuses, mention may be made of an extruder, a kneader, a batch-type kneading device, and the like. In addition, in the method in which the kneading step is carried out in a reactor, or in the case of the materials to be kneaded having high viscosity, a mixing method with a static mixer can be employed. In addition, a wet mixing method in which a solvent is added to the materials to be kneaded can also be employed.

In the polylactic acid compositions of the present invention, conventional antioxidants, UV absorbing agents, stabilizers, metal soaps, lubricants, surfactants, coloring agents, foaming agents, and the like, can also be added. The added amount thereof is not particularly limited so long as the amount does not impair the effects of the present invention. The amount preferably ranges from 0.01 to 10% by mass with respect to the amount of the polylactic acid composition.

The polylactic acid composition of the present invention can also be easily processed into a film by means of conventional T die-cast molding, extrusion molding such as inflation molding, or the like. The polylactic acid composition of the present invention can be processed into a multi-layered film by means of plural extruders. Thickness of the film formed from the polylactic acid composition of the present invention is not particularly limited, includes the thickness of a so-called sheet, and is preferably in the range of from 5 μm to 2 mm, which is generally employed.

The formed film is subjected to a drawing treatment, and thereby, molecular orientation occurs. Therefore, physical properties such as impact resistance, flexibility, transparency, and the like, can be improved. The aforementioned drawing treatment can be carried out at temperatures of not lower than the Tg, but not higher than the melting point, in accordance with a conventional method such as a tenter method or an inflation method for monoaxial and biaxial orientation. The treatment is preferably carried out in the range of Tg of the polylactic acid composition to (Tg+50)° C.

In the case of monoaxial orientation, by vertical orientation in accordance with a roller method or by horizontal orientation by means of a tenter, the drawing is preferably carried out 1.3 to 10 times in the vertical direction or the horizontal direction. The drawing ratio is preferably in the range of 1.3 to 6 times in the vertical direction and the horizontal direction, respectively. If the drawing ratio is below 1.3 times, it is difficult to produce a film having sufficient strength. On the other hand, if it exceeds 6 times, a film tends to be broken during drawing.

In addition, in order to enhance thermal resistance, a thermal setting treatment is carried out under the tension conditions immediately after drawing. Thereby, strain can be removed, or crystallization can be accelerated, to enhance thermal resistance characteristics. The temperature of the thermal setting treatment can range from the temperature of (−20° C.+crystallization temperature (Tc)) to the temperature below the melting point of the polylactic acid. If the treatment is carried out preferably at 70 to 150° C., and more preferably at 90 to 150° C., not only thermal resistance, but also other film physical properties such as tensile strain are enhanced. Therefore, this is preferable.

As the secondary processing methods of the film, conventional vacuum molding methods, air-press molding methods, vacuum air-press molding methods, and the like, can be utilized. In the film formation of the polylactic acid composition of the present invention, moldings can be formed by means of known apparatuses employed in film formation of commonly employed resins.

During film formation, a bag-shaped product can be produced by easily heat-sealing by means of common bag-making apparatuses such as a horizontal pillow bag-making apparatus, a vertical pillow bag-making apparatus, or a twist bag-making apparatus.

In addition, the moldings such as containers can be produced by means of common injection molding machines, without particular problems. Blow molding is also easily carried out, and mono-layered or multi-layered bottles can be formed by means of common molding machines. Press molding can provide mono-layered or laminated products by means of common molding machines without particular problems.

The polylactic acid composition of the present invention has Izod impact strength obtained by measurement described in the Examples ranging from 3 to 20 (kJ/m$^2$), preferably ranging from 6 to 20 (kJ/m$^2$), and more preferably ranging from 9 to 20 (kJ/m$^2$), and possesses superior impact strength, by adjusting the added amount of the polylactic acid composition of the present invention. In addition, in non-oriented films or oriented films, for example, in the case of those having a thickness of 200 μm, DUPONT impact strength ranges from 0.20 to 5.0 J, and superior impact resistance is exhibited. Furthermore, in oriented and thermally-set films, for example, in the case of those having a thickness of 35 μm, film impact ranges from 1 to 10 J.

In addition, the polylactic acid compositions of the present invention can provide superior flexibility by adjusting the added amount of the modifier for a lactic acid of the present invention. For example, the polylactic acid composition is formed into a film having thickness of 200 μm, and then, storage modulus (E') measured at 20° C., at a frequency of 6.28 radian/sec by means of RSAII produced by Rheometrics Co., Ltd., of the polylactic acid composition, in which the modifier for a polylactic acid of the present invention is added, ranges from 0.5 to 2.8 GPa. On the other hand, the storage modulus (E') of the polylactic acid ranges from 3.0 to 3.5 GPa.

In addition, the modifier for a polylactic acid of the present invention can maintain the thermal resistance of the polylactic acid, and at the same time, can impart impact resistance. For example, the polylactic acid composition comprising a polylactic acid and the modifier for the polylactic acid of the present invention can control great reduction in Tg (61° C.) which the polylactic acid possesses, and has Tg of 50° C. or higher, even in the case in which, for example, the modifier for the polylactic acid is added in an amount of 30% by mass with respect to the amount of the polylactic acid.

In addition, the modifier for a polylactic acid of the present invention slightly impairs transparency of the polylactic acid. For example, in the case of a polylactic acid composition in which the added amount of the modifier for a polylactic acid is not more than 15% by mass, with a pressed film having thickness of 100 μm, a transparent film having a haze value of 20% of less can be produced. In the case in which the added amount of the modifier for a polylactic acid of the present invention is reduced, a film with higher transparency having a haze value of 10% or less can be produced.

The modifier for a polylactic acid of the present invention has characteristics in that bleed-out properties from the polylactic acid composition comprising the aforementioned modifier are low. For example, when a sheet with thickness of 250 μm having a size of 10×10 cm square of a polylactic acid composition comprising not more than 50% by mass of the modifier for a polylactic acid of the present invention is allowed to stand in a thermo-hydrostat chamber of 35° C. and 80% humidity, bled products from the surface of the aforementioned moldings are not observed for 90 or more days.

The modifier for a polylactic acid of the present invention and the polylactic acid composition comprising the aforementioned modifier exhibit good biodegradable properties. Even if they are dumped into the sea, they can be degraded by hydrolysis, biodegradation, or the like. In seawater, the strength of the resins deteriorates over several months, and they can be degraded so that the outer shape thereof is not maintained. In addition, when a compost is employed, they are biodegraded in an even shorter period so that the original shape is not maintained.

The polylactic acid compositions comprising the modifiers for a polylactic acid of the present invention can be applied to usages in which a polylactic acid is employed without problems, and can be applied to further wider usages. For example, the polylactic acid compositions of the present invention are useful as resins for molding, materials for sheets/films, resins for coatings, resins for inks, resins for toners, adhesive resins, materials for medicines, lamination for papers, foaming resin materials, and the like, and are, in particular, useful as packaging materials and adhesive agents.

As examples of sheets for packaging materials, mention may be made of, for example, trays, cups, dishes, blisters, aluminum-deposition sheets, and the like. In addition, as examples of films for packaging materials, mention may be made of shrinking films, wrapping films, aluminum-deposition films, food packaging films, other common packaging films, bags such as disposable bags, shopping bags, general standard bags, heavy-duty bags, and the like.

As examples of other usages of the polylactic acid compositions of the present invention, mention may be made of, for example, blow moldings such as various bottles, or containers; medical and sanitary products such as paper diapers, or sanitary items; medical products such as suture thread; agricultural materials such as germination sheets, seed strings, agricultural multifilms, coating agents for delayed release agrochemicals and fertilizers, bird nets, protective sheet, or seedling pots; prepaid cards, ropes, non-woven fabrics, buffering materials, packaging materials, and the like.

EXAMPLES

In the following, the present invention is described in detail with Examples and Comparative Examples. It should be understood that the present invention is not limited to these Examples. In addition, "%" and "parts" described below are the values calculated on the basis of mass unless otherwise indicated.

The measurements carried out in the Examples are described below.

Measurement of Molecular Weight

Molecular weight was measured by means of a gel permeation chromatography measurement apparatus (hereinafter, referred to as "GPC"), "HLC-8020" produced by Tosoh Corporation, at 40° C. of column temperature, employing tetrahydrofuran as a solvent, and employing a polystyrene standard sample.

Measurement of Thermal Physical Properties

Transition temperature (Tg) and melting point (Tm) were measured by means of a differential scanning calorimeter (hereinafter, referred to as "DSC"), "DSC 220C" produced by Seiko Instruments Inc., by increasing temperature at a rate of 10° C./min in the range of −100° C. to 200° C. As the glass transition temperature, extrapolation glass transition initiating temperature was employed, and as the melting point, the melting peak temperature was employed (JIS-K-7121).

Measurement of Storage Modulus

In the case in which the polymer was solid at room temperature, storage modulus (E') of a sheet having a size of 200 μm (thickness)×5 mm (width)×35 mm (length) was measured by Film Texture Geometry by means of "RSA-II" produced by Rheometrics Co., Ltd., under the conditions of 22.4 mm of a chuck gap, 6.28 radian/sec of measurement frequency, and −50° C. to 120° C. The storage modulus (E') shown in the Tables is represented by a measured value at 20° C., and the unit thereof is giga pascal (GPa).

In the case in which the polymer was liquid at room temperature, storage modulus was measured with a parallel plate having a diameter of 25 mm by means of "RDS-II" produced by Rheometrics Co., Ltd., under the conditions of 6.28 radian/sec of measurement frequency, and −50° C. to 100° C. The storage modulus (G') shown in the Tables is represented by a measured value at 20° C., and the unit thereof is mega pascal (MPa).

Measurement of Haze

A film with a size of 10 cm (height)×10 cm (width) was cut into a piece with a size of 5 cm (height)×5 cm (width), and subsequently, haze was measured by means of a turbidity meter ("ND-1001 DP", produced by Nippon Denshoku Industries Co., Ltd.).

Measurement Method of Izod Impact Strength

Izod impact strength was measured in accordance with an Izod (hereinafter, referred to as IZOD) impact test method implemented in relation to Japanese Industrial Standards, K 7110 (JIS-K-7110). That is, injection molding was carried out by means of a mini max molder (produced by CSI Co., Ltd.) under conditions of 170° C. to 190° C., thus forming a test piece for IZOD with a size of 6 mm (width)×3 mm (thickness)×31 mm (height). Subsequently, the test piece was processed by 1.2 mm notch in the width direction of the test piece by means of a notching machine (produced by TECNO-SUPPLY Co., Ltd.). The test piece for IZOD with notch was subjected to measurement by means of IZDO measurement apparatus "POE 2000" (produced by GRC Co., Ltd.).

Measurement Method of DUPONT Impact Strength

50% breaking energy of the produced film was obtained in accordance with a DUPONT impact strength measurement method of Japanese Industrial Standards, K 5400 (JIS-K-5400) by dropping a plumb bob having a specified weight from varied heights, and judging presence or absence of breaks. The convex part to be contacted with the film is formed from a steel, and is in the smooth semi-spherical form with a radius of 6.3 mm (produced by Ueshima Seisakusho Co., Ltd.).

Film Impact Test

Film impact was measured by a method implemented in relation to ASTMD-3420.

Evaluation of Compatibility with a Polylactic Acid

Compatibility of each of the polymers obtained in Reference Examples 1 to 8 and a polylactic acid was evaluated as described below. That is, 90% by mass of a polylactic acid and 10% by mass of the polymer obtained in the Reference Example were melt-kneaded by means of a Labo Plastomill produced by Toyo Seiki Seisaku-sho, Ltd., while being heated to 190° C., and while the mixture was then heat-melted at 190° C. by means of a hot press machine, the mixture was pressed for 3 minutes at a pressure of 20 MPa, thus producing a film having a thickness of 250 μm. The obtained film was allowed to stand for 24 hours at room temperature, and subsequently, a haze value was measured. The case in which the haze value was below 20% was expressed as ○, and the case in which the haze value was 20% or more was expressed as X.

Reference Example 1

Synthesis Example of a Polymer (A-1)

Into a reactor with a volume of 10 L, equipped with a stirrer, a rectifier, and a gas inlet tube, succinic acid (hereinafter, referred to as "SuA") and propylene glycol (hereinafter, referred to as "PG") in an amount of 1.3 mole equivalents with respect to SuA were charged. The mixture was heated and stirred under a nitrogen stream while the temperature thereof was increased from 150° C. at a rate of 7° C./hour. While produced water was being removed, the mixture was heated to 220° C. After two hours, titanium tetrabutoxide, in an amount of 0.006%, as an esterification catalyst, was added thereto. Under reduced pressure of 0.1 KPa, the mixture was stirred for 8 hours, thus producing a polymer (A-1) which was liquid at 20° C.

Reference Example 2

Synthesis Example of a Polymer (A-2)

Into a reactor with a volume of 10 L, equipped with a stirrer, a rectifier, and a gas inlet tube, SuA and ethylene glycol (hereinafter, referred to as "EG") in an amount of 1.3 mole equivalents with respect to SuA were charged. The mixture was heated and stirred under a nitrogen stream while the temperature thereof was increased from 150° C. at a rate of 7° C./hour. While produced water was being removed, the mixture was heated to 220° C. After two hours, tributyl tin oxide, in an amount of 0.005%, as an esterification catalyst, was added thereto. Under reduced pressure of 0.1 KPa, the mixture was stirred for 2 hours.

Toluene was added to the obtained reaction mixture to form a 20% solution, and hexamethylene diisocyanate (hereinafter, referred to as "HMDI"), in an amount of 0.05% with respect to the polyester, was added thereto. In addition, tin octanoate, in an amount of 0.01% with respect to the polyester, was added thereto, and the mixture was stirred for one hour at 60° C. Subsequently, the mixture was naturally cooled, thus producing a polymer (A-2) which was solid at 20° C.

Reference Example 3

Synthesis Example of a Polymer (A-3)

Into a reactor with a volume of 50 L, equipped with a stirrer, a rectifier, and a gas inlet tube, adipic acid (hereinafter, referred to as "AA") and propylene glycol (hereinafter, referred to as "PG") in an amount of 1.4 mole equivalents with respect to AA were charged. The mixture was heated and stirred under a nitrogen stream while the temperature thereof was increased from 150° C. at a rate of 10° C./hour. While produced water was being removed, the mixture was heated to 220° C. After two hours, titanium tetrabutoxide, in an amount of 0.013%, as an esterification catalyst, was added thereto. Under reduced pressure of 0.1 KPa, the mixture was stirred for 8 hours. Subsequently, the mixture was naturally cooled, thus producing a polymer (A-3) which was liquid at 20° C.

Reference Example 4

Synthesis Example of a Polymer (B-1)

Into a reactor with a volume of 50 L, equipped with a stirrer, a rectifier, and a gas inlet tube, a dimer acid ("Empol 1061" produced by Cognis Co., Ltd., hereinafter, referred to as "DA") and PG, in an amount of 1.4 mole equivalents with respect to DA, were charged. The mixture was heated and stirred under a nitrogen stream while the temperature thereof was increased from 150° C. at a rate of 10° C./hour. While produced water was being removed, the mixture was heated to 220° C. After two hours, titanium tetraisopropoxide, in an amount of 0.007%, as an esterification catalyst, was added thereto. Under reduced pressure of 0.1 KPa, the mixture was stirred for 3 hours. Subsequently, the mixture was naturally cooled, thus producing a polymer (B-1) which was liquid at 20° C.

Reference Example 5

Synthesis Example of a Polymer (B-2)

Into a reactor with a volume of 50 L, equipped with a stirrer, a rectifier, and a gas inlet tube, a hydrogenated dimer acid ("Empol 1008" produced by Cognis Co., Ltd., hereinafter, referred to as "DAH") and 1,4-butanediol (hereinafter, referred to as "1,4BG") in an amount of 1.4 mole equivalents with respect to DAH were charged. The mixture was heated and stirred under a nitrogen stream while the temperature thereof was increased from 150° C. at a rate of 10° C./hour. While produced water was being removed, the mixture was heated to 220° C. After two hours, titanium tetrabutoxide, in an amount of 0.007%, as an esterification catalyst, was added thereto. Under reduced pressure of 0.1 KPa, the mixture was stirred for one hour. Subsequently, the mixture was naturally cooled, thus producing a polymer (B-2) which was liquid at 20° C.

Reference Example 6

Synthesis Example of a Polymer (B-3)

Into a reactor with a volume of 50 L, equipped with a stirrer, a rectifier, and a gas inlet tube, DA and 1,6-hexanediol (hereinafter, referred to as "HD"), in an amount of 1.2 mole equivalents with respect to DA were charged. The mixture was heated and stirred under a nitrogen stream while the temperature thereof was increased from 150° C. at a rate of 7° C./hour. While produced water was being removed, the mixture was heated to 220° C. After the mixture was stirred for two hours, the mixture was naturally cooled, thus producing an aliphatic polyester which was liquid at 20° C.

Subsequently, to the aliphatic polyester, pyromellitic anhydride (hereinafter referred to as "PMDA"), in an amount of 0.3% with respect to the aliphatic polyester, was added. Under reduced pressure of 0.1 KPa at 210° C., the mixture was further stirred for three hours, thus producing a polymer (B-3).

Reference Example 7

Synthesis Example of a Polymer (B-4)

Into a reactor with a volume of 50 L, equipped with a stirrer, a rectifier, and a gas inlet tube, sebacic acid (hereinafter, referred to as "SeA") and 1,3-butylene glycol (hereinafter, referred to as "1,3BG") in an amount of 1.4 mole equivalents with respect to SeA were charged. The mixture was heated and stirred under a nitrogen stream while the temperature thereof was increased from 150° C. at a rate of 10° C./hour. While produced water was being removed, the mixture was heated to 220° C. After two hours, titanium tetrabutoxide, in an amount of 0.013%, as an esterification catalyst, was added thereto. Under reduced pressure of 0.1 KPa, the mixture was stirred for 8 hours. Subsequently, the mixture was naturally cooled, thus producing a polymer (B-4) which was liquid at 20° C.

Reference Example 8

Synthesis Example of a Polymer (B-5)

A polymer (B-5) which was liquid at 20° C. was produced by reacting SeA and PG, in an amount of 1.35 mole equivalents with respect to SeA, in the same manner as described in Reference Example 1.

The results of the polymers obtained in Reference Examples 1 to 8 are shown in Table 2 and Table 3.

TABLE 2

|  |  | Reference Example 1 | Reference Example 2 | Reference Example 3 |
|---|---|---|---|---|
| Diol component | Glycol | PG | EG | PG |
| Dicarboxylic acid component | Dicarboxylic acid | SuA | SuA | AA |
| Polymer (A) | Mw (×10,000) | 2.9 | 2.8 | 3.4 |
|  | Mn (×10,000) | 1.8 | 1.6 | 1.8 |
|  | σ/ρ | 8.10 | 8.18 | 8.29 |
|  | Tg (° C.) | −39 | −1 | −59 |
|  | Compatibility with a polylactic acid | ○ | ○ | ○ |
| Name of a polymer |  | A-1 | A-2 | A-3 |

In the Table, Mw represents a mass average molecular weight, Mn represents a number average molecular weight, and Tg represents a glass transition temperature (hereinafter, they have the same meanings as described above).

TABLE 3

|  |  | Reference Example 4 | Reference Example 5 | Reference Example 6 | Reference Example 7 | Reference Example 8 |
|---|---|---|---|---|---|---|
| Diol component | Glycol | PG | 1,4BG | HD | 1,3BG | PG |
| Dicarboxylic acid component | Dicarboxylic acid | DA | DAH | DA | SeA | SeA |
| Polymer (B) | Mw (×10,000) | 3.0 | 2.2 | 3.2 | 6.0 | 5.4 |
|  | Mn (×10,000) | 1.8 | 1.3 | 1.8 | 3.4 | 3.0 |
|  | σ/ρ | 8.78 | 8.63 | 8.86 | 8.59 | 8.54 |
|  | Tg (° C.) | −61 | −43 | −36 | −43 | −42 |
|  | Compatibility with a polylactic acid | X | X | X | X | X |
| Name of a polymer |  | B-1 | B-2 | B-3 | B-4 | B-5 |

Preparation Example 1

Synthesis Example of a Block Polymer (C)

50 parts of the polymer (A-1) and 50 parts of the polymer (B-4) were placed in a separable flask, and were melted at 180° C. After the mixture was in the form of a uniform solution, 0.005 parts of titanium tetraisopropoxide (corresponding to the amount of 0.005% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-1).

In addition, a spectrum of $^{13}C$-nuclear magnetic resonance (hereinafter, referred to as NMR) in the range of approximately 170 to 175 ppm of the block polymer (C-1) was measured. The result thereof is shown in FIG. 1, (i).

The block polymer (C-1) is a polymer having the repeating units constituting the polymer (A-1) and the repeating units constituting the polymer (B-4) by a polycondensation reaction due to deglycolation between the terminal glycols of the polymer (A-1) and the polymer (B-4). In addition, according to (i) of the NMR shown in FIG. 1, it is clear that in the block polymer (C-1), peaks originated from the 1,3BG-SuA bond at approximately 171.7 ppm and 172.1 ppm, and in addition, peaks originated from the PG-SeA bond at approximately 173.1 ppm and at 173.4 ppm newly appeared. Furthermore, from (i) of the NMR shown in FIG. 1, it can be seen that the ratio of the number ($n_1$) of newly formed 1,3BG-SuA bond and PG-SeA bond and the number ($n_2$) of the PG-SuA bond of the polymer (A-1) and the 1,3BG-SeA bond of the polymer (B-4), that is, n1:n2 equals to approximately 1:4 since the ratio of the peak area ($S_1$) originated from the newly formed 1,3BG-SuA bond and PG-SeA bond and the peak area ($S_2$) originated from the PG-SuA bond of the polymer (A-1) and the 1,3BG-SeA bond of the polymer (B-4), that it, $S_1:S_2$ equals approximately 1:4.

Preparation Example 2

Synthesis Example of a Block Polymer (C)

40 parts of the polymer (A-1) and 60 parts of the polymer (B-2) were placed in a separable flask, and were melted at 180° C. After the mixture was in the form of a uniform solution, 0.01 parts of tin octanoate (corresponding to the amount of 0.01% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-2).

Preparation Example 3

Synthesis Example of a Block Polymer (C)

80 parts of the polymer (A-2) and 20 parts of the polymer (B-3) were placed in a separable flask, and were melted at 180° C. After the mixture was in the form of a uniform solution, 0.007 parts of titanium tetrabutoxide (corresponding to the amount of 0.007% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-3).

Preparation Example 4

Synthesis Example of a Block Polymer (C)

60 parts of a polypropylene glycol (referred to as "PPG") having a number average molecular weight of 3,000 and 40 parts of the polymer (B-1) were placed in a separable flask, and were melted at 175° C. After the mixture was in the form of a uniform solution, 0.005 parts of titanium bisacetyl acetonate (corresponding to the amount of 0.005% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-4).

Preparation Example 5

Synthesis Example of a Block Polymer (C)

50 parts of the polymer (A-3) and 50 parts of the polymer (B-4) were placed in a separable flask, and were melted at 180° C. After the mixture was in the form of a uniform solution, 0.005 parts of titanium tetraisopropoxide (corresponding to the amount of 0.005% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-5).

The results of Preparation Examples 1 to 5 are together shown in Table 4 and Table 5.

Comparative Preparation Example 1

50 parts of the polymer (B-1) and 50 parts of the polymer (B-2) were placed in a separable flask, and were melted at 180° C. After the mixture was in the form of a uniform solution, 0.007 parts of titanium tetrabutoxide (corresponding to the amount of 0.007% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-6).

Comparative Preparation Example 2

50 parts of the polymer (A-1) and 50 parts of the polymer (A-3) were placed in a separable flask, and were melted at 180° C. After the mixture was in the form of a uniform solution, 0.007 parts of titanium tetrabutoxide (corresponding to the amount of 0.007% of the total amount of both polymers as raw materials) was added thereto. Under reduced pressure of 0.1 KPa at 220° C., the mixture was stirred for 12.5 hours. Subsequently, the mixture was naturally cooled, thus producing a block polymer (C-7).

Comparative Preparation Example 3

50 parts of a polylactic acid (produced by Shimadzu Corporation, "Lacti #1012", mass average molecular weight=250,000, number average molecular weight=160,000, hereinafter, referred to as "PLA") and 50 parts of the polymer (B-4) were placed in a separable flask, and were melted at 180° C. After the mixture was in the form of a uniform solution, 0.02 parts of titanium tetrabutoxide (corresponding to the amount of 0.02% of the total amount of both polymers as raw materials) was added thereto. Under reduced pressure of 0.1 KPa at 200° C., the mixture was stirred for 5 hours. Subsequently, the mixture was naturally cooled, thus producing a block polymer (C-8).

The results of Comparative Synthetic Examples 1 to 3 are together shown in Table 6.

TABLE 4

| | | Preparation Example 1 | Preparation Example 2 | Preparation Example 3 |
|---|---|---|---|---|
| Polymer (A) | Name of polymer used | A-1 | A-1 | A-2 |
| | σ/ρ | 8.10 | 8.10 | 8.18 |
| | Feed amount (parts) | 50 | 40 | 80 |
| Polymer (B) | Name of polymer used | B-4 | B-2 | B-3 |
| | σ/ρ | 8.59 | 8.63 | 8.86 |
| | Feed amount (parts) | 50 | 60 | 20 |
| Block polymer (C) | Name of block polymer | C-1 | C-2 | C-3 |
| | Mw (×10,000) | 5.5 | 4.7 | 6.8 |
| | Mn (×10,000) | 2.8 | 2.4 | 3.5 |
| | Tg (° C.) | −40 | −41 | −35, −2 |
| | Storage modulus G' (MPa) 20° C. | 0.31 | 0.43 | 110* |

*shown by the measured value by storage modulus (E') (hereinafter, it has the same meaning)

TABLE 5

| | | Preparation Example 4 | Preparation Example 5 |
|---|---|---|---|
| Polymer (A) | Name of polymer used | PPG | A-3 |
| | σ/ρ | 8.26 | 8.29 |
| | Feed amount (parts) | 60 | 50 |
| Polymer (B) | Name of polymer used | B-1 | B-4 |
| | σ/ρ | 8.78 | 8.59 |
| | Feed amount (parts) | 40 | 50 |
| Block polymer (C) | Name of block polymer | C-4 | C-5 |
| | Mw (×10,000) | 4.0 | 5.2 |
| | Mn (×10,000) | 2.4 | 2.8 |
| | Tg (° C.) | −54 | −55, −46 |
| | Storage modulus G' (MPa) 20° C. | 0.01 | 0.21 |

TABLE 6

|  |  | Comparative Preparation Example 1 | Comparative Preparation Example 2 | Comparative Preparation Example 3 |
|---|---|---|---|---|
| Polymer | Name of polymer used | B-1 | A-1 | PLA |
|  | σ/ρ | 8.78 | 8.10 | 7.70 |
|  | Feed amount (parts) | 50 | 50 | 50 |
| Polymer | Name of polymer used | B-2 | A-3 | B-4 |
|  | σ/ρ | 8.63 | 8.29 | 8.59 |
|  | Feed amount (parts) | 50 | 50 | 50 |
| Block polymer (C) | Name of block polymer | C-6 | C-7 | C-8 |
|  | Mw (×10,000) | 5.5 | 5.5 | 10 |
|  | Mn (×10,000) | 2.7 | 2.8 | 5.2 |
|  | Tg (° C.) | −45, −57 | −52, −42 | −42, 57 |
|  | Storage modulus G' (MPa) 20° C. | 0.19 | 0.09 | 10* |

Examples 1 to 5 and Comparative Examples 1 to 6

Preparation Examples of Polylactic Acid Compositions

With a polylactic acid (PLA), each of the block polymers (C-1) to (C-5) prepared in Preparation Examples 1 to 5 and the block polymers (C-6) to (C-8) prepared in Comparative Preparation Examples 1 to 3, as a modifier for a polylactic acid, using the composition components and composition ratios as described in Tables 7 to 10, was kneaded by means of a biaxial extruder, Labo Plastomill produced by Toyo Seiki Seisaku-sho, Ltd., while being heated at 200° C. Subsequently, the mixture was formed into pellets, thus producing polylactic acid compositions (P-1) to (P-11).

In Comparative Example 3, the polymer (B-1) was added as a modifier component instead of the modifier for a polylactic acid. In Comparative Example 4, the polymer (A-3) was added as a modifier component instead of the modifier for a polylactic acid. In Comparative Example 5, no modifier for a polylactic acid was added, and PLA, per se, was employed, thus producing a polylactic acid composition.

Test Example 1

Preparation of a Polylactic Acid Composition Sheet

Each of the polylactic acid compositions (P-1) to (P-11) produced in Examples 1 to 5 and Comparative Examples 1 to 6 was dried under reduced pressure while heating for 6 hours at 100° C. The polylactic acid composition, in an amount of 3.3 g, and a PET sheet having a thickness of 250 µm with a 10 cm×10 cm square hole were put between PET films, each having a thickness of 100 µm, followed by pressing this at 20 MPa for one minute while being heated and melted at 190° C., thus producing a sheet.

Subsequently, the sheet was treated with a water-cooling presser for 10 minutes, was then taken out, and was allowed to stand for 24 hours at room temperature. The haze value of the produced sheet having a size of 10 cm×10 cm with a thickness of 250 µm was measured in accordance with JIS-K-7127.

Test Example 2

Bleed-Out Test of a Polylactic Acid Composition Sheet

A sheet formed from each of the polylactic acid compositions (P-1) to (P-11) produced in Test Example 1 was allowed to stand in a thermo-hydrostatic chamber, PR-2F produced in Tabaiesupekku [phonetic spelling] Co., Ltd., maintaining at 35° C. with 80% humidity.

Test Example 3

Preparation of a Bi-Axial Oriented Thermal Set Film of a Polylactic Acid Composition Each of the polylactic acid compositions (P-1) to (P-11) produced in Examples 1 to 5 and Comparative Examples 1 to 6 was pressed for 3 minutes under the conditions of 195° C. and 5 MPa by means of a compact thermal press. Subsequently, the pressed product was immediately cooled, and a 200 µm sheet (vertical 12 cm, horizontal 12 cm) was formed. Subsequently, the sheet was subjected to sequential drawing at a drawing rate of 10 mm/sec under the drawing temperature condition of 60° C. with a chuck gap of 10 cm by means of a biaxial orientation apparatus (produced by Iwamoto Co., Ltd.) to draw 2.5 times in the vertical direction and 2.5 times in the horizontal direction. Subsequently, this was subjected to thermal set for 50 sec at 140° C. in an air oven, thus producing a biaxial oriented thermal set film having a thickness of 35 µm. In the biaxial oriented thermal set film as described above, a DUPONT impact value and a haze value thereof were measured.

The measurement results of Test Examples 1 to 3 are together shown in Table 7 to Table 9.

TABLE 7

|  |  | Example 1 | Example 2 | Example 3 | Example 4 | Example 5 |
|---|---|---|---|---|---|---|
| Polylactic acid | Molecular weight (Mw) (×10,000) | 25 | 25 | 25 | 25 | 25 |
|  | Molecular weight (Mn) (×10,000) | 16 | 16 | 16 | 16 | 16 |
|  | Feed amount (parts) | 90 | 85 | 95 | 70 | 95 |
| Modifier for a polylactic acid | Name of block polymer | C-1 | C-2 | C-3 | C-4 | C-5 |
|  | σ/ρ Polymer (A) | 8.10 | 8.10 | 8.18 | 8.26 | 8.29 |

TABLE 7-continued

|  |  | Example 1 | Example 2 | Example 3 | Example 4 | Example 5 |
|---|---|---|---|---|---|---|
|  | Polymer (B) | 8.59 | 8.63 | 8.86 | 8.78 | 8.59 |
|  | Feed amount (parts) | 10 | 15 | 5 | 30 | 5 |
| Polylactic acid composition | Name of composition | P-1 | P-2 | P-3 | P-4 | P-5 |
|  | Tg (° C.) | 58 | 56 | 57 | 57 | 58 |
|  | m.p. (° C.) | 170 | 171 | 171 | 170 | 168 |
|  | Storage modulus (GPa) 20° C. | 2.2 | 1.8 | 2.7 | 1.7 | 2.9 |
|  | IZOD impact strength (KJ/m$^2$) | 3.8 | 4.5 | 3.5 | 4.5 | 3.7 |
|  | Tensile stretch at break (%) | 29 | 59 | 10 | 26 | 12 |
| 250 μm sheet | DUPONT impact value (J) | 0.46 | 0.50 | 0.38 | 0.91 | 0.36 |
|  | Haze (%) | 10.1 | 17.2 | 7.2 | 10.1 | 19.2 |
|  | Period until bleed out was first observed | one or more years | 200 days | one or more years | one or more years | one or more years |
| 35 μm biaxial oriented thermal set film | Film impact (J) | 2.1 | 2.2 | 1.7 | 2.5 | 1.9 |
|  | Haze (%) | 4 | 3 | 3 | 4 | 7 |

TABLE 8

|  |  | Comparative Example 1 | Comparative Example 2 | Comparative Example 3 |
|---|---|---|---|---|
| Polylactic acid | Molecular weight (Mw) (×10,000) | 25 | 25 | 25 |
|  | Molecular weight (Mn) (×10,000) | 16 | 16 | 16 |
|  | Feed amount (parts) | 85 | 75 | 85 |
| Modifier | Name of block copolymer | C-6 | C-7 | B-1 |
|  | σ/ρ   Polymer (A) | — | 8.10, 8.29 | — |
|  | Polymer (B) | 8.78, 8.63 | — | 8.78 |
|  | Feed amount (parts) | 15 | 25 | 15 |
| Polylactic acid composition | Name of composition | P-6 | P-7 | P-8 |
|  | Tg (° C.) | 57 | 47 | 57 |
|  | m.p. (° C.) | 172 | 170 | 175 |
|  | Storage modulus (GPa) 20° C. | 2.1 | 1.8 | 2.7 |
|  | IZOD impact strength (KJ/m$^2$) | 5.1 | 2.2 | 3.7 |
|  | Tensile stretch at break (%) | 12 | 88 | 7 |
| 250 μm sheet | DUPONT impact value (J) | 0.18 | 0.10 | 0.15 |
|  | Haze (%) | 39.0 | 5.9 | 55.5 |
|  | Period until bleed out was first observed | one day | one or more years | one day |
| 35 μm biaxial oriented thermal set film | Film impact (J) | 0.6 | 0.8 | 0.7 |
|  | Haze (%) | 20 | 5 | 29 |

TABLE 9

|  |  | Comparative Example 4 | Comparative Example 5 | Comparative Example 6 |
|---|---|---|---|---|
| Polylactic acid | Molecular weight (Mw) (×10,000) | 25 | 25 | 25 |
|  | Molecular weight (Mn) (×10,000) | 16 | 16 | 16 |
|  | Feed amount (parts) | 85 | 100 | 90 |
| Modifier | Name of block polymer | A-3 | absence | C-8 |
|  | σ/ρ   Polymer (A) | 8.29 | — | 7.70 |
|  | Polymer (B) | — | — | 8.59 |
|  | Feed amount (parts) | 15 | 0 | 10 |

TABLE 9-continued

|  |  | Comparative Example 4 | Comparative Example 5 | Comparative Example 6 |
|---|---|---|---|---|
| Polylactic acid composition | Name of composition | P-9 | P-10 | P-11 |
|  | Tg (° C.) | 52 | 61 | 56 |
|  | m.p. (° C.) | 172 | 175 | 168 |
|  | Storage modulus (GPa) 20° C. | 3.1 | 3.1 | 2.6 |
|  | IZOD impact strength (KJ/m$^2$) | 2.2 | 2.1 | 3.7 |
|  | Tensile stretch at break (%) | 110 | 12 | 15 |
| 250 μm sheet | DUPONT impact value (J) | 0.10 | 0.10 | 0.35 |
|  | Haze (%) | 2.5 | 1.5 | 11 |
|  | Period until bleed out was first observed | one or more years | one or more years | one or more years |
| 35 μm biaxial oriented thermal set film | Film impact (J) | 0.6 | 0.7 | 1.7 |
|  | Haze (%) | 1.9 | 0.4 | 4 |

The polylactic acid composition (P-6) produced in Comparative Example 1 had Tg of 57° C., had a melting point of 172° C., and had a storage modulus at room temperature of 2.1 GPa, and flexibility was exhibited. However, the haze value of a film with a thickness of 250 μm was 20% or more, and poor transparency was exhibited, and stickiness at the surface was observed. From these results, it can be seen that a modifier formed from the block polymer (C-6) exhibited poor compatibility with a polylactic acid.

A polylactic acid composition (P-7) produced in Comparative Example 2 had Tg of less than 50° C., and a film having a thickness of 250 μm exhibited superior transparency, but exhibited poor flexibility.

A film having a thickness of 250 μm, formed from a polylactic acid composition (P-8) produced in Comparative Example 3 was opaque (haze value: 55.5%), and stickiness remained. From these results, it can be seen that a modifier formed from a block polymer (C-6) exhibited low compatibility with a polylactic acid.

A film having a thickness of 250 μm, formed from the polylactic acid composition (P-9) produced in Comparative Example 4 had high transparency (haze value: 2.5%), and exhibited an increased numerical value of tensile strain, but impact strength was 2.2 KJ/m$^2$ which was approximately equivalent to that of a polylactic acid. From these results, it can be seen that in the case of employing the polymer (A-3) as a modifier for a polylactic acid, superior compatibility with a polylactic acid could be exhibited, but impact strength was approximately the same as that of a polylactic acid, and therefore, the polymer did not exhibit a function of providing impact resistance as a modifier for a polylactic acid.

From the result of Comparative Example 5, it can be seen that a polylactic acid, per se, had an izod impact strength of 2.1 KJ/m$^2$, and poor impact resistance was exhibited.

A film having a thickness of 250 μm, formed from the polylactic acid composition (P-11) produced in Comparative Example 6 had high transparency (haze value: 11.0%). From the results, it can be seen that a modifier for a polylactic acid formed from the block polymer (C-6) had high compatibility with a polylactic acid, and exhibited high impact strength. However, as compared with the composition of Example 5, in order to obtain the same impact strength as that of the composition of Example 5, it was necessary to add a double amount thereof. Therefore, it can be seen that the effect of providing impact resistance was half.

From these results described above, it can be seen that the polylactic acid compositions comprising the modifier for a polylactic acid of the present invention exhibited superior impact strength and tensile strain, and that as compared with a film formed from the composition of each of the comparative examples, the film formed from the polylactic acid composition of the present invention exhibited superior transparency and superior bleed-out resistance.

Preparation Example 6

Synthesis Example of a Block Polymer (C)

50 parts of the polymer (A-1) and 50 parts of the polymer (B-4) were placed in a separable flask, and were melted at 120° C. After the mixture was in the form of a uniform solution, 1.4 parts of hexamethylene diamine (HMDI) (corresponding to the amount of 1.4% of the total amount of both polymers as raw materials) and 0.01 parts of dibutyl tin dilaurate (corresponding to the amount of 0.01% of the total amount of both polymers as raw materials) were added thereto. The mixture was stirred for 6 hours at 120° C. at a normal pressure, thus producing a block polymer (C-9). A spectrum of $^{13}$C-NMR in the range of approximately 170 ppm to 175 ppm of the block polymer (C-9) was measured. The result thereof is shown in FIG. 1, (ii).

From the results of the measurement of molecular weight by GPC and (ii) of the NMR shown in FIG. 1, it can be seen that the block polymer (C-9) was a polymer in which lengthening the chain was carried out by an addition reaction of the polymer (A-1) and the polymer (B-4) with HMDI, and which included a block polymer having a repeating unit formed from the polymer (A-1) and a repeating unit formed from the polymer (B-4).

Preparation Example 7

Synthesis Example of a Block Polymer (C)

A block polymer (C-10) was prepared by carrying out the same reactions as described in Preparation Example 6, with the exception of employing 40 parts of the polymer (A-1), 60 parts of the polymer (B-2), 1.0 part of toluene diisocy anate (hereinafter, referred to as "TDI") (corresponding to the amount of 1.0% of the total amount of both polymers as raw materials), and 0.006 parts of titanium tetraisopropoxide (corresponding to the amount of 0.006% of the total amount of both polymers as raw materials).

Preparation Example 8

Synthesis Example of a Block Polymer (C)

A block polymer (C-11) was prepared by carrying out the same reactions as described in Preparation Example 6, with the exception of employing 50 parts of the polymer (A-3), 50 parts of the polymer (B-4), 1.9 parts of hydrogenated diphenylmethane diisocyanate (hereinafter, referred to as "DPDIH") (corresponding to the amount of 1.9% of the total amount of both polymers as raw materials), and 0.006 parts of tin octanoate (corresponding to the amount of 0.006% of the total amount of both polymers as raw materials).

Preparation Example 9

Synthesis Example of a Block Polymer (C)

A block polymer (C-12) was prepared by carrying out the same reactions as described in Preparation Example 6, with the exception of employing 50 parts of the polymer (A-1), 50 parts of the polymer (B-5), 0.7 parts of HMDI (corresponding to the amount of 0.7% of the total amount of both polymers as raw materials), and 0.006 parts of dibutyl tin dilaurate (corresponding to the amount of 0.006% of the total amount of both polymers as raw materials).

The results of Preparation Examples 6 to 9 are together shown in Table 10.

Comparative Preparation Example 4

A block polymer (C-13) was prepared by carrying out the same reactions as described in Preparation Example 6, with the exception of employing 50 parts of the polymer (B-1), 50 parts of the polymer (B-2), 0.7 parts of HMDI (corresponding to the amount of 0.7% of the total amount of both polymers as raw materials), and 0.006 parts of dibutyl tin dilaurate (corresponding to the amount of 0.006% of the total amount of both polymers as raw materials).

Comparative Preparation Example 5

A block polymer (C-14) was prepared by carrying out the same reactions as described in Preparation Example 6, with the exception of employing 50 parts of the polymer (A-1), 50 parts of the polymer (A-3), 0.7 parts of TDI (corresponding to the amount of 0.7% of the total amount of both polymers as raw materials), and 0.006 parts of dibutyl tin dilaurate (corresponding to the amount of 0.006% of the total amount of both polymers as raw materials).

Comparative Preparation Example 6

50 parts of a polylactic acid ("Lacti #1012" produced by Shimadzu Corporation; hereinafter, referred to as "PLA") and 50 parts of the polymer (B-4) were placed in a separable flask, and the mixture was melted at 210° C. After the mixture was in the form of a uniform solution, 1.4 parts of DPDIH (corresponding to the amount of 1.4% of the total amount of both polymers as raw materials), and 0.006 parts of dibutyl tin dilaurate (corresponding to the amount of 0.006% of the total amount of both polymers as raw materials) were added thereto. Subsequently, the mixture was reacted by stirring for 2 hours at 200° C. under a normal pressure, thus producing a block polymer (C-15).

The results of Comparative Preparation Examples 4 to 6 are together shown in Table 11.

TABLE 10

| | | Preparation Example 6 | Preparation Example 7 | Preparation Example 8 | Preparation Example 9 |
|---|---|---|---|---|---|
| Polymer (A) | Name of polymer used | A-1 | A-1 | A-3 | A-1 |
| | σ/ρ | 8.10 | 8.10 | 8.29 | 8.10 |
| | Feed amount (parts) | 50 | 40 | 50 | 50 |
| Polymer (B) | Name of polymer used | B-4 | B-2 | B-4 | B-5 |
| | σ/ρ | 8.59 | 8.63 | 8.59 | 8.54 |
| | Feed amount (parts) | 50 | 60 | 50 | 50 |
| Block polymer (C) | Name of block polymer | C-9 | C-10 | C-11 | C-12 |
| | Mw (×10,000) | 7.4 | 5.8 | 5.5 | 8.1 |
| | Mn (×10,000) | 3.0 | 2.9 | 2.8 | 3.9 |
| | Tg (° C.) | −43 | −41 | −58, −44 | −42 |
| | Storage modulus G' (MPa) 20° C. | 0.44 | 0.50 | 0.29 | 0.43 |

TABLE 11

| | | Comparative Preparation Example 4 | Comparative Preparation Example 5 | Comparative Preparation Example 6 |
|---|---|---|---|---|
| Polymer (A) | Name of polymer used | B-1 | A-1 | PLA |
| | σ/ρ | 8.78 | 8.10 | 7.70 |
| | Feed amount (parts) | 50 | 50 | 50 |
| Polymer (B) | Name of polymer used | B-2 | A-3 | B-4 |
| | σ/ρ | 8.63 | 8.29 | 8.59 |
| | Feed amount (parts) | 50 | 50 | 50 |
| Block polymer | Name of block polymer | C-13 | C-14 | C-15 |

TABLE 11-continued

|   |   | Comparative Preparation Example 4 | Comparative Preparation Example 5 | Comparative Preparation Example 6 |
|---|---|---|---|---|
| (C) | Mw (×10,000) | 5.5 | 7.1 | 10 |
|   | Mn (×10,000) | 2.7 | 3.4 | 5.2 |
|   | Tg (° C.) | −60, −44 | −40, −57 | −42, 59 |
|   | Storage modulus G' (MPa) 20° C. | 0.21 | 0.12 | 22* |

Examples 6 to 9 and Comparative Examples 7 to 9

Preparation of Compositions with Polylactic Acids

Each of the block polymers (C-9) to (C-12) produced in Preparation Examples 6 to 9 was mixed as a modifier for a polylactic acid with a polylactic acid (PLA) using the composition components and the composition ratios shown in Table 12, and the mixture was kneaded by means of a biaxial extruder, Labo Plastomill produced by Toyo Seiki Seisaku-sho, Ltd., by heating at 200° C. Subsequently, the mixture was formed into pellets, thus producing polylactic acid compositions (P-12) to (P-15). In addition, in the same manner as described above, polylactic acid compositions (P-16) to (P-18) were produced by employing the block polymers (C-13) to (C-15) produced in Comparative Preparation Examples 4 to 6 using the composition components and the composition ratios shown in Table 13, and kneading the mixture with heating, and subsequently, formulating the mixture into pellets.

Test Example 4

Preparation of a Polylactic Acid Composition Sheet

A sheet was produced in the same manner as described in Test Example 1, employing each of the polylactic acid compositions (P-12) to (P-18) produced in Examples 6 to 9 and Comparative Examples 7 to 9, and each of measurements therefor was carried out.

Test Example 5

Bleed-Out Test of a Polylactic Acid Sheet

The sheets formed from the polylactic acid compositions (P-12) to (P-18) produced in Test Example 4 were subjected to measurements in the same manners as described in Test Example 2.

Test Example 6

Preparation of a Biaxial Oriented Thermal Set Film of a Polylactic Acid Composition The sheets respectively formed from the polylactic acid compositions (P-12) to (P-18) produced in Examples 6 to 9 and Comparative Examples 7 to 9 were subjected to measurements in the manners as described in Test Example 3.

The measurement results of Test Examples 4 to 6 are together shown in Tables 12 and 13.

TABLE 12

|   |   |   | Example 6 | Example 7 | Example 8 | Example 9 |
|---|---|---|---|---|---|---|
| Polylactic acid | Molecular weight (Mw) (×10,000) |   | 25 | 25 | 25 | 25 |
|   | Molecular weight (Mn) (×10,000) |   | 16 | 16 | 16 | 16 |
|   | Feed amount (parts) |   | 90 | 85 | 95 | 95 |
| Modifier for a polylactic acid | Name of block polymer |   | C-9 | C-10 | C-11 | C-12 |
|   | σ/ρ | Polymer (A) | 8.10 | 8.10 | 8.29 | 8.10 |
|   |   | Polymer (B) | 8.59 | 8.63 | 8.59 | 8.54 |
|   | Feed amount (parts) |   | 10 | 15 | 5 | 5 |
| Polylactic acid composition | Name of composition |   | P-12 | P-13 | P-14 | P-15 |
|   | Tg (° C.) |   | 56 | 55 | 58 | 58 |
|   | m.p. (° C.) |   | 169 | 170 | 168 | 168 |
|   | Storage modulus (GPa) 20° C. |   | 2.2 | 1.7 | 2.8 | 2.8 |
|   | IZOD impact strength (KJ/m$^2$) |   | 4.3 | 5.1 | 3.9 | 3.8 |
|   | Tensile stretch at break (%) |   | 53 | 77 | 21 | 12 |
| 250 μm sheet | DUPONT impact value (J) |   | 0.54 | 0.57 | 0.40 | 0.38 |
|   | Haze (%) |   | 15 | 19 | 19 | 17 |
|   | Period until bleed out was first observed |   | one or more years | 200 days | one or more years | one or more years |
| 35 μm biaxial oriented thermal set film | Film impact (J) |   | 2.4 | 2.7 | 2.0 | 1.9 |
|   | Haze (%) |   | 7 | 6 | 8 | 7 |

TABLE 13

|  |  | Comparative Example 7 | Comparative Example 8 | Comparative Example 9 |
|---|---|---|---|---|
| Polylactic acid | Molecular weight (Mw) (×10,000) | 25 | 25 | 25 |
|  | Molecular weight (Mn) (×10,000) | 16 | 16 | 16 |
|  | Feed amount (parts) | 85 | 75 | 90 |
| Modifier | Name of block polymer | C-13 | C-14 | C-15 |
|  | σ/ρ  Polymer (A) | — | 8.10, 8.29 | 7.70 |
|  |        Polymer (B) | 8.78, 8.63 | — | 8.59 |
|  | Feed amount (parts) | 15 | 25 | 10 |
| Polylactic acid composition | Name of composition | P-16 | P-17 | P-18 |
|  | Tg (° C.) | 56 | 45 | 56 |
|  | m.p. (° C.) | 169 | 167 | 168 |
|  | Storage modulus (GPa) 20° C. | 2.0 | 1.9 | 2.6 |
|  | IZOD impact strength (KJ/m$^2$) | 5.3 | 2.6 | 3.7 |
|  | Tensile stretch at break (%) | 15 | 105 | 23 |
| 250 µm sheet | DUPONT impact value (J) | 0.19 | 0.12 | 0.38 |
|  | Haze (%) | 43 | 7.5 | 13 |
|  | Period until bleed out was first observed | one day | one or more years | one or more years |
| 35 µm biaxial oriented thermal set film | Film impact (J) | 0.6 | 0.9 | 1.8 |
|  | Haze (%) | 20 | 7 | 6 |

The polylactic acid composition (P-16) produced in Comparative Example 7 had Tg of 56° C., had a melting point of 169° C., and had a storage modulus at room temperature of 2.0 GPa, and flexibility was exhibited. However, stickiness at the surface was observed.

A polylactic acid composition (P-17) produced in Comparative Example 8 exhibited superior transparency, but exhibited poor flexibility, and had Tg of less than 50° C.

A film having a thickness of 250 µm, formed from a polylactic acid composition (P-18) produced in Comparative Example 9 had high transparency, and exhibited high compatibility with a polylactic acid. However, as compared with the composition of Example 8, in order to obtain the same impact strength as that of the composition of Example 8, it was necessary to add a double amount thereof. Therefore, it can be seen that the effect of providing impact resistance was poor.

It can be seen that the polylactic acid compositions comprising the modifiers for polylactic acid, formed from polyesters, of the present invention, produced in Examples 6 to 9, exhibited superior impact strength and tensile strain, and that bleed-out was controlled.

Preparation Example 10

Synthesis Example of a Block Polymer (C)

50 parts of the polymer (A-1) and 50 parts of the polymer (B-4) were placed in a separable flask, and were melted at 200° C. After the mixture was in the form of a uniform solution, 0.1 parts of pyromellitic anhydride (PMDA) (corresponding to the amount of 0.1% of the total amount of both polymers as raw materials) and 0.1 parts of titanium tetrabutoxide (corresponding to the amount of 0.1% of the total amount of both polymers as raw materials) were added thereto. The mixture was stirred for 7 hours at 200° C. under reduced pressure of 0.1 KPa, and was subsequently cooled naturally, thus producing a block polymer (C-16). A spectrum of $^{13}$C-NMR in the range of approximately 170 ppm to 175 ppm of the block polymer (C-16) was measured. The result thereof is shown in FIG. 1, (iii).

From the results of measurement of molecular weight by GPC and (iii) of the NMR shown in FIG. 1, it can be apparently seen that the block polymer (C-16) was a polymer in which lengthening the chain was carried out by a polycondensation reaction of the polymer (A-1) and the polymer (B-4) with PMDA, and which included a block polymer having a repeating unit formed from the polymer (A-1) and a repeating unit formed from the polymer (B-4).

Preparation Example 11

Synthesis Example of a Block Polymer (C)

40 parts of the polymer (A-1) and 60 parts of the polymer (B-2) were placed in a separable flask, and were melted at 180° C. After the mixture was in the form of a uniform solution, 0.1 parts of PMDA (corresponding to the amount of 0.1% of the total amount of both polymers as raw materials) and 0.005 parts of titanium tetraisopropoxide (corresponding to the amount of 0.005% of the total amount of both polymers as raw materials) were added thereto. The mixture was stirred for 2 hours under reduced pressure of 0.1 KPa at 180° C., and was subsequently cooled naturally, thus producing a block polymer (C-17).

Preparation Example 12

Synthesis Example of a Block Polymer (C)

A block polymer (C-18) was prepared by carrying out the same reactions as described in Preparation Example 11, with the exception of employing 50 parts of the polymer (A-3), 50 parts of the polymer (B-4), and 0.2 parts of PMDA (corresponding to the amount of 0.2% of the total amount of both polymers as raw materials).

Preparation Example 13

Synthesis Example of a Block Polymer (C)

A block polymer (C-19) was prepared by carrying out the same reactions as described in Preparation Example 11, with the exception of employing 50 parts of the polymer (A-1), 50 parts of the polymer (B-5), 0.2 parts of anhydrous cyclohexane dicarboxylic acid (hereinafter, referred to as "AnCHDA") (corresponding to the amount of 0.2% of the total amount of both polymers as raw materials), and 0.005 parts of titanium tetrabutoxide (corresponding to the amount of 0.005% of the total amount of both polymers as raw materials).

The results of Preparation Examples 10 to 13 are together shown in Table 14.

Comparative Preparation Example 7

A block polymer (C-20) was prepared by carrying out the same reactions as described in Preparation Example 11, with the exception of employing 50 parts of the polymer (B-1), 50 parts of the polymer (B-2), 0.1 parts of PMDA (corresponding to the amount of 0.1% of the total amount of both polymers as raw materials), and 0.005 parts of titanium tetrabutoxide (corresponding to the amount of 0.005% of the total amount of both polymers as raw materials).

Comparative Preparation Example 8

A block polymer (C-21) was prepared by carrying out the same reactions as described in Preparation Example 11, with the exception of employing 50 parts of the polymer (A-1), 50 parts of the polymer (A-3), 0.2 parts of TMDA (corresponding to the amount of 0.2% of the total amount of both polymers as raw materials), and 0.005 parts of titanium tetrabutoxide (corresponding to the amount of 0.005% of the total amount of both polymers as raw materials).

Comparative Preparation Example 9

50 parts of a polylactic acid ("Lacti #1012" produced by Shimadzu Corporation; hereinafter, referred to as "PLA") and 50 parts of the polymer (B-4) were placed in a separable flask, and the mixture was melted at 200° C. After the mixture was in the form of a uniform solution, 0.1 parts of PMDA (corresponding to the amount of 0.1% of the total amount of both polymers as raw materials) and 0.02 parts of titanium tetrabutoxide (corresponding to the amount of 0.02% of the total amount of both polymers as raw materials) were added thereto. The mixture was stirred for one hour under reduced pressure of 0.1 KPa at 200° C., thus producing a block polymer (C-22).

The results of Comparative Preparation Examples 7 to 9 are shown in Table 15.

Comparative Preparation Example 10

Into a reactor with a volume of 10 L, equipped with a stirrer, a rectifier, and a gas inlet tube, 0.63 mole equivalents of SuA, 0.39 mole equivalents of SeA, 0.88 mole equivalents of PG, and 0.47 mole equivalents of 1,3BG were charged. The mixture was heated and stirred under a nitrogen stream while the temperature thereof was increased from 150° C. at a rate of 10° C./hour. While produced water was being removed, the mixture was heated to 220° C. After two hours, titanium tetrabutoxide, in an amount of 0.006%, as an esterification catalyst, was added thereto. Under reduced pressure of 0.1 KPa, the mixture was stirred for 8 hours, and was subsequently cooled naturally, thus producing a random copolymer (C-23) which was liquid at 20° C. A spectrum of $^{13}$C-NMR in the range of approximately 170 ppm to 175 ppm of the random copolymer (C-23) was measured. The result thereof is shown in FIG. 1, (iv).

In accordance with the NMR (iv) shown in FIG. 1, in the random copolymer (C-23), peaks originated from the respective diol components and the bond with a dicarboxylic acid component were observed, the integration ratio of the peaks originated from the PG-SuA bond and the PG-SeA bond was approximately the same. In addition, the integration ratio of the peaks originated from the 1,3BG-SuA bond and the 1,3BG-SeA bond was also approximately the same.

Comparative Preparation Example 11

In a reactor, 50 parts of the polymer (A-1) and 50 parts of the polymer (B-4) were melted and kneaded for 10 minutes at 100° C., thus producing a polyester composition (C-24). A spectrum of $^{13}$C-NMR in the range of approximately 170 ppm to 175 ppm of the polyester composition (C-24) was measured. The result thereof is shown in FIG. 1 (v).

TABLE 14

|  |  | Preparation Example 10 | Preparation Example 11 | Preparation Example 12 | Preparation Example 13 |
| --- | --- | --- | --- | --- | --- |
| Polymer (A) | Name of polymer used | A-1 | A-1 | A-3 | A-1 |
|  | σ/ρ | 8.10 | 8.10 | 8.29 | 8.10 |
|  | Feed amount (parts) | 50 | 40 | 50 | 50 |
| Polymer (B) | Name of polymer used | B-4 | B-2 | B-4 | B-5 |
|  | σ/ρ | 8.59 | 8.63 | 8.59 | 8.54 |
|  | Feed amount (parts) | 50 | 60 | 50 | 50 |
| Block polymer (C) | Name of block polymer | C-16 | C-17 | C-18 | C-19 |
|  | Mw (×10,000) | 9.0 | 6.0 | 5.0 | 8.8 |
|  | Mn (×10,000) | 3.5 | 3.1 | 2.4 | 4.3 |
|  | Tg (° C.) | −41 | −40 | −57, −45 | −43 |
|  | Storage modulus G' (MPa) 20° C. | 0.51 | 0.49 | 0.32 | 0.47 |

TABLE 15

|  |  | Comparative Preparation Example 7 | Comparative Preparation Example 8 | Comparative Preparation Example 9 |
|---|---|---|---|---|
| Polymer (A) | Name of polymer used | B-1 | A-1 | PLA |
|  | σ/ρ | 8.78 | 8.10 | 7.70 |
|  | Feed amount (parts) | 50 | 50 | 50 |
| Polymer (B) | Name of polymer used | B-2 | A-3 | B-4 |
|  | σ/ρ | 8.63 | 8.29 | 8.59 |
|  | Feed amount (parts) | 50 | 50 | 50 |
| Block polymer (C) | Name of block polymer | C-20 | C-21 | C-22 |
|  | Mw (×10,000) | 5.5 | 8.0 | 12.7 |
|  | Mn (×10,000) | 2.5 | 3.6 | 5.7 |
|  | Tg (° C.) | −59, −45 | −56, −41 | −40, 58 |
|  | Storage modulus G' (MPa) 20° C. | 0.20 | 0.18 | 19* |

Examples 10 to 13 and Comparative Examples 10 to 14

Preparation of Compositions with Polylactic Acids

Each of the block polymers (C-16) to (C-19) produced in Preparation Examples 10 to 13 was mixed as a modifier for a polylactic acid with a polylactic acid (PLA) using the composition components and the composition ratios shown in Table 16, and the mixture was kneaded by means of a biaxial extruder, Labo Plastomill produced by Toyo Seiki Seisaku-sho, Ltd., by heating at 200° C. Subsequently, the mixture was formed into pellets, thus producing polylactic acid compositions (P-19) to (P-22). In addition, in the same manner as described above, polylactic acid compositions (P-23) to (P-27) were produced by employing the block polymers (C-20) to (C-22), the random polymer (C-23), and the polyester composition (C-24) produced in Comparative Preparation Examples 7 to 11, which had the composition components and the composition ratios shown in Table 17, and kneading the mixture with heating, and subsequently, formulating the mixture into pellets.

TABLE 16

|  |  |  | Example 10 | Example 11 | Example 12 | Example 13 |
|---|---|---|---|---|---|---|
| Polylactic acid | Molecular weight (Mw) (×10,000) |  | 25 | 25 | 25 | 25 |
|  | Molecular weight (Mn) (×10,000) |  | 16 | 16 | 16 | 16 |
|  | Feed amount (parts) |  | 90 | 85 | 95 | 95 |
| Modifier for a polylactic acid | Name of block polymer |  | C-16 | C-17 | C-18 | C-19 |
|  | σ/ρ | Polymer (A) | 8.10 | 8.10 | 8.29 | 8.10 |
|  |  | Polymer (B) | 8.59 | 8.63 | 8.59 | 8.54 |
|  | Feed amount (parts) |  | 10 | 15 | 5 | 5 |
| Polylactic acid composition | Name of composition |  | P-19 | P-20 | P-21 | P-22 |
|  | Tg (° C.) |  | 58 | 55 | 58 | 58 |
|  | m.p. (° C.) |  | 171 | 170 | 170 | 170 |
|  | Storage modulus (GPa) 20° C. |  | 2.3 | 1.9 | 2.8 | 2.7 |
|  | IZOD impact strength (KJ/m²) |  | 4.1 | 4.7 | 3.9 | 3.8 |
|  | Tension stretch at break (%) |  | 38 | 55 | 15 | 10 |
| 250 μm sheet | DUPONT impact value (J) |  | 0.51 | 0.52 | 0.39 | 0.40 |
|  | Haze (%) |  | 11 | 17 | 19 | 16 |
|  | Period until bleed out was first observed |  | one or more years | 200 days | one or more years | one or more years |
| 35 μm biaxial oriented thermal set film | Film impact (J) |  | 2.3 | 2.3 | 1.9 | 1.6 |
|  | Haze (%) |  | 7 | 5 | 8 | 9 |

TABLE 17

|  |  | Comparative Example 10 | Comparative Example 11 | Comparative Example 12 | Comparative Example 13 | Comparative Example 14 |
|---|---|---|---|---|---|---|
| Polylactic acid | Molecular weight (Mw) (×10,000) | 25 | 25 | 25 | 25 | 25 |
|  | Molecular weight (Mn) (×10,000) | 16 | 16 | 16 | 16 | 16 |

TABLE 17-continued

|  |  | Comparative Example 10 | Comparative Example 11 | Comparative Example 12 | Comparative Example 13 | Comparative Example 14 |
|---|---|---|---|---|---|---|
| Modifier for a polylactic acid | Feed amount (parts) | 85 | 75 | 90 | 90 | 90 |
|  | Symbol of modifier | C-20 | C-21 | C-22 | C-23 | C-24 |
|  | σ/ρ Polymer (A) | — | 8.10, 8.29 | 7.70 | — | — |
|  | Polymer (B) | 8.78, 8.63 | — | 8.59 | — | — |
| Polylactic acid composition | Feed amount (parts) | 15 | 25 | 10 | 10 | 10 |
|  | Name of composition | P-23 | P-24 | P-25 | P-26 | P-27 |
|  | Tg (° C.) | 57 | 48 | 59 | 55 | 55 |
|  | m.p. (° C.) | 171 | 170 | 168 | 169 | 168 |
|  | Storage modulus (GPa) 20° C. | 2.3 | 2.8 | 2.7 | 2.7 | 2.8 |
|  | IZOD impact strength (KJ/m$^2$) | 5.0 | 2.4 | 3.8 | 2.0 | 2.3 |
|  | Tensile stretch at break (%) | 13 | 96 | 17 | 15 | 14 |
| 250 μm sheet | DUPONT impact value (J) | 0.19 | 0.11 | 0.37 | 0.10 | 0.18 |
|  | Haze (%) | 50 | 7.0 | 12 | 36 | 41 |
|  | Period until bleed out was first observed | one day | one or more years | one or more years | 3 days | one day |
| 35 μm biaxial oriented thermal set film | Film impact (J) | 0.6 | 0.8 | 1.8 | 0.5 | 0.7 |
|  | Haze (%) | 24 | 9 | 5 | 18 | 19 |

Test Example 7

Preparation of a Polyester Composition Sheet

A sheet was produced in the same manner as described in Test Example 1, employing each of the polyester compositions (P-19) to (P-27) produced in Examples 10 to 13 and Comparative Examples 10 to 14, and each of measurements therefor was carried out.

Test Example 8

Bleed-Out Test of a Polyester Composition Sheet

The sheets formed from the polyester compositions (P-19) to (P-27) produced in Test Example 7 were subjected to measurements in the same manners as described in Test Example 2.

Test Example 9

Preparation of a Biaxial Oriented Thermal Set Film of a Polyester Composition

Each of the polyester compositions (P-19) to (P-27) produced in Examples 10 to 13 and Comparative Examples 10 to 14 was pressed for 3 minutes under the conditions of 195° C. and 5 MPa by means of a compact thermal press. Subsequently, the pressed product was immediately cooled, and a 200 μm sheet (vertical 12 cm, horizontal 12 cm) was formed. Subsequently, the sheet was subjected to sequential drawing at a drawing rate of 10 mm/sec under the drawing temperature condition of 60° C. with a chuck gap of 10 cm by means of a biaxial orientation apparatus (produced by Iwamoto Co., Ltd.) to draw 2.5 times in the vertical direction and 2.5 times in the horizontal direction. Subsequently, this was subjected to thermal set for 50 sec at 140° C. in an air oven, thus producing a biaxial oriented thermal set film having a thickness of 35 μm. In the biaxial oriented thermal set film as described above, a film impact and a haze value thereof were measured.

The measurement results described above are together shown in Tables 16 and 17.

The polyester composition (P-23) produced in Comparative Example 10 had Tg of 57° C., and had a melting point of 170° C. It had a storage modulus at room temperature of 2.0 GPa, and flexibility was exhibited. However, the haze value of a film with a thickness of 250 μm was 20% or more, and poor transparency was exhibited, and stickiness at the surface was observed.

The polyester composition (P-24) produced in Comparative Example 11 exhibited superior transparency, but exhibited poor flexibility, and had Tg of less than 50° C.

A film having a thickness of 250 μm, formed from a polyester composition (P-25) produced in Comparative Example 12, exhibited high transparency (haze value=12%). For this reason, it can be apparently seen that the polyester had high compatibility with a polylactic acid. In addition, it also exhibited high impact strength. However, it can be seen that as compared with that of Example 12, in order to obtain the same impact strength as that thereof, it was necessary to add a double amount of an agent for providing impact resistance.

A film having a thickness of 250 μm, formed from a polyester composition (P-26) produced in Comparative Example 13, had poor transparency (haze value: 36%), and impact strength was 2.0 KJ/m² which was as low as approximately that of a polylactic acid. From these results, it can be seen that an agent for imparting impact resistance could not be provided by the random polymer as produced in Comparative Preparation Example 10, and superior impact resistance and transparency could be exhibited by the block polymers produced in Preparation Example 1, Preparation Example 6, and Preparation Example 10.

A film having a thickness of 250 μm, formed from the polyester composition (P-27) produced in Comparative Example 14, had poor transparency (haze value: 41%). Bleed-out at the surface thereof was observed, and impact strength was as low as 2.3 KJ/m². From these results, it can be seen that an agent for imparting impact resistance could not be provided by the blend polymers as described in Comparative Preparation Example 11, but impact resistance and transparency could be exhibited by the block polymers produced in Preparation Example 1, Preparation Example 6, and Preparation Example 10.

In the Examples, it can be seen that the polylactic acid compositions comprising modifiers for use in a polylactic acid having any structures in the present invention exhibit high impact strength, tensile strain, and bleed-out resistance.

Test Example 11

Biodegradability of a Polyester Composition Sheet

A sheet formed from each of the polyester compositions (P-1) to (P-5), (P-12) to (P-14), and (P-18) to (P-20), produced in the Test Examples 1, 4, and 7, was interposed between metallic meshes, and was allowed to place in an electrically driven compost apparatus which was maintained at 45° C. In order to avoid an anaerobic circumstance, stirring was carried out at several hour intervals. After 30 days, the sheet was taken out. As a result, all sheets were ragged and the original shapes could not be maintained. After 60 days, sheets disappeared and were not found.

INDUSTRIAL APPLICABILITY

The modifiers of the present invention can enhance impact resistance, flexibility, and tensile strain of the produced polylactic acid composition by adding the modifier to the polylactic acid, while biodegradability of the polylactic acids and thermal resistance are maintained, and in addition, have advantages in that properties of bleed-out from the moldings formed from a polylactic acid composition are reduced. In addition, in accordance with the polylactic acid compositions comprising the modifiers of the present invention, moldings formed from the polylactic acid compositions, in which superior impact resistance, flexibility, tensile strain, transparency, and thermal resistance are exhibited, and at the same time, bleed-out resistance is controlled, can be provided.

The invention claimed is:

1. A polylactic acid composition comprising a polylactic acid and a modifier for a polylactic acid, wherein the modifier comprises a block polymer (C) having a polymer block (A) satisfying relationship (1):

$$7.80 \leq \sigma/\rho < 8.54$$

wherein σ represents a solubility parameter value of a polymer block; ρ represents a density value of a polymer block; and the value of σ/ρ is obtained in accordance with σ/ρ=ΣFi/M, wherein Fi represents a molar attraction constant of the chemical group and M represents a molar molecular weight per repeating unit;

and a polymer block (B) satisfying relationship (2):

$$8.54 \leq \sigma/\rho < 9.20$$

wherein σ and ρ have the same meanings as described above, wherein each of said polymer (A) and said polymer (B) is independently a polymer block selected from the group consisting of a polyester block, a polyether block, and a polyhydroxycarboxylic acid block, and said block polymer (C) has a glass transition temperature of 0° C. or lower.

2. The polylactic acid composition according to claim 1, wherein the modifier for a polylactic acid is included in an amount of 1 to 50% by mass in the polylactic acid composition.

3. The polylactic acid composition according to claim 1, having impact strength of not less than 3 kJ/m² in accordance with the Izod impact test method implemented in relation to Japanese Industrial Standards, K 7110.

4. A method for modifying a polylactic acid comprising the step of adding a modifier for a polylactic acid to a polylactic acid, wherein the modifier comprises a block polymer (C) having a polymer block (A) satisfying relationship (1):

$$7.80 \leq \sigma/\rho < 8.54$$

wherein σ represents a solubility parameter value of a polymer block: ρ represents a density value of a polymer block; and the value of σ/ρ is obtained in accordance with σ/ρ=ΣFi/M, wherein Fi represents a molar attraction constant of the chemical group and M represents a molar molecular weight per repeating unit;

and a polymer block (B) satisfying relationship (2):

$$8.54 \leq \sigma/\rho < 9.20$$

wherein σ and ρ have the same meanings as described above, wherein each of said polymer (A) and said polymer (B) is independently a polymer block selected from the group consisting of a polyester block, a polyether block, and a polyhydroxycarboxylic acid block, and said block polymer (C) has a glass transition temperature of 0° C. or lower.

* * * * *